(12) United States Patent
Mizuno et al.

(10) Patent No.: US 12,187,356 B2
(45) Date of Patent: Jan. 7, 2025

(54) VEHICULAR AERODYNAMIC DEVICE

(71) Applicant: AISIN CORPORATION, Kariya (JP)

(72) Inventors: Hideki Mizuno, Kariya (JP); Yukihide Shibutani, Kariya (JP)

(73) Assignee: AISIN CORPORATION, Kariya (JP)

( * ) Notice: Subject to any disclaimer, the term of this patent is extended or adjusted under 35 U.S.C. 154(b) by 323 days.

(21) Appl. No.: 17/821,919

(22) Filed: Aug. 24, 2022

(65) Prior Publication Data

US 2023/0071962 A1    Mar. 9, 2023

(30) Foreign Application Priority Data

Sep. 7, 2021   (JP) .................... 2021-145321

(51) Int. Cl.
    *B62D 35/00*   (2006.01)
    *B62D 35/02*   (2006.01)
    *B62D 37/02*   (2006.01)

(52) U.S. Cl.
    CPC ............ *B62D 35/02* (2013.01); *B62D 35/005* (2013.01); *B62D 37/02* (2013.01)

(58) Field of Classification Search
    CPC ....... B62D 35/005; B62D 35/02; B62D 37/02
    See application file for complete search history.

(56) References Cited

U.S. PATENT DOCUMENTS

| | | | |
|---|---|---|---|
| 9,956,998 B2* | 5/2018 | Zielinski | B62D 35/02 |
| 10,981,611 B2* | 4/2021 | Matthews | B62D 35/005 |
| 11,040,744 B2* | 6/2021 | Shiga | B62D 35/02 |
| 11,155,312 B2* | 10/2021 | Shiga | B62D 37/02 |
| 11,161,557 B2* | 11/2021 | Urbach | B62D 35/005 |
| 2015/0084369 A1* | 3/2015 | Niemi | B62D 35/02 296/180.1 |
| 2017/0106922 A1* | 4/2017 | Povinelli | B62D 37/02 |
| 2017/0120968 A1* | 5/2017 | Povinelli | B62D 37/02 |
| 2018/0134329 A1* | 5/2018 | Cha | B62D 37/02 |
| 2019/0118872 A1* | 4/2019 | Shiga | B62D 37/02 |
| 2019/0152543 A1* | 5/2019 | Shiga | B62D 37/02 |

(Continued)

FOREIGN PATENT DOCUMENTS

| | | |
|---|---|---|
| JP | 2016-44749 A | 4/2016 |
| JP | 2020-90278 A | 6/2020 |

*Primary Examiner* — Gregory A Blankenship
(74) *Attorney, Agent, or Firm* — Oblon, McClelland, Maier & Neustadt, L.L.P.

(57) ABSTRACT

A vehicular aerodynamic device includes first and second links being coupled via first and second engagement members and integrally rotating, thereby transmitting drive force to an aerodynamic member. The first and second engagement members are coupled to the first and second links, respectively, and integrally rotate by engaging with each other, and rotate relative to each other by external force. At least one of a first coupling portion that couples the first link and the first engagement member and a second coupling portion that couples the second link and the second engagement member includes clutch-side and link-side engagement surfaces integrally rotating by engaging with each other. A second gap between the clutch-side and link-side engagement surfaces in a second relative rotation direction is narrower than a first gap between the clutch-side and link-side engagement surfaces in a first relative rotation direction.

7 Claims, 13 Drawing Sheets

(56) References Cited

U.S. PATENT DOCUMENTS

| | | | |
|---|---|---|---|
| 2020/0094889 A1* | 3/2020 | Shiga | B62D 35/005 |
| 2020/0164934 A1* | 5/2020 | Shiga | B62D 35/005 |
| 2021/0139088 A1* | 5/2021 | Tachi | B62D 35/005 |
| 2021/0269103 A1* | 9/2021 | Lindberg | B62D 37/02 |
| 2023/0065474 A1* | 3/2023 | Umino | B62D 35/02 |
| 2023/0071962 A1* | 3/2023 | Mizuno | B62D 37/02 |
| 2023/0174171 A1* | 6/2023 | Hung | B62D 35/005 |
| | | | 296/180.5 |
| 2023/0286599 A1* | 9/2023 | Matsumoto | B62D 37/02 |
| 2024/0051623 A1* | 2/2024 | Tachi | B62D 35/02 |

* cited by examiner

VEHICULAR AERODYNAMIC DEVICE

CROSS REFERENCE TO RELATED APPLICATIONS

This application is based on and claims priority under 35 U.S.C. § 119 to Japanese Patent Application No. 2021-145321, filed on Sep. 7, 2021, the entire content of which is incorporated herein by reference.

TECHNICAL FIELD

This disclosure generally relates to a vehicular aerodynamic device.

BACKGROUND DISCUSSION

Conventionally, there is a vehicular aerodynamic device that causes an aerodynamic member such as a spoiler or a spat to be deployed and retracted, based on drive force to be transmitted via a link unit. For example, a spoiler device disclosed in JP2020-90278A (Reference 1) includes a clutch mechanism interposed between link members that constitute a link unit. Based on an operation of the clutch mechanism, external force applied to the aerodynamic member can be released.

In the spoiler device of the above-described prior art, a coupling portion that couples the clutch mechanism and the link member to each other is configured as a fitting-coupling portion that rotates integrally by engagement between a clutch side and a link side. Thereby, assembling work thereof is facilitated.

However, in the configuration of the above-described prior art, there is a possibility that the aerodynamic member provided at one end of the link unit rattles due to a gap between a clutch-side engagement surface and a link-side engagement surface that constitute the fitting-coupling portion. For example, JP2016-44749A (Reference 2) or the like discloses a configuration in which a backlash-filling snap ring is inserted into the gap formed between two engagement members. However, there is a possibility that adopting such a backlash-filling member causes an increase in number of components and complexity in assembling work.

A need thus exists for a vehicular aerodynamic device which is not susceptible to the drawback mentioned above.

SUMMARY

A vehicular aerodynamic device that solves the above-described problem includes a link unit and an aerodynamic member. The link unit is configured by coupling a plurality of link members to one another. The aerodynamic member is deployed and retracted based on drive force to be transmitted via the link unit. The link unit transmits the drive force to the aerodynamic member by integral rotation, around a coupling shaft, of a first link and a second link as the link members that are coupled to each other via a clutch mechanism. The clutch mechanism includes a first engagement member and a second engagement member. The first engagement member is coupled to the first link. The second engagement member is coupled to the second link. The first engagement member and the second engagement member rotate integrally around the coupling shaft by engaging with each other, and rotate relative to each other by external force being applied to the aerodynamic member and larger than force of mutual engagement. At least one of a first coupling portion that couples the first link and the first engagement member to each other and a second coupling portion that couples the second link and the second engagement member to each other is a fitting-coupling portion including a clutch-side engagement surface and a link-side engagement surface that rotate integrally around the coupling shaft by engaging with each other. A first gap is generated, between the clutch-side engagement surface and the link-side engagement surface, in a first relative rotation direction in which the aerodynamic member is displaced in a deployment direction, based on the external force. A second gap is generated, between the clutch-side engagement surface and the link-side engagement surface, in a second relative rotation direction in which the aerodynamic member is displaced in a retraction direction, based on the external force. The second gap is narrower than the first gap.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, one embodiment of a vehicular aerodynamic device is described with reference to the drawings.

Figure 1:
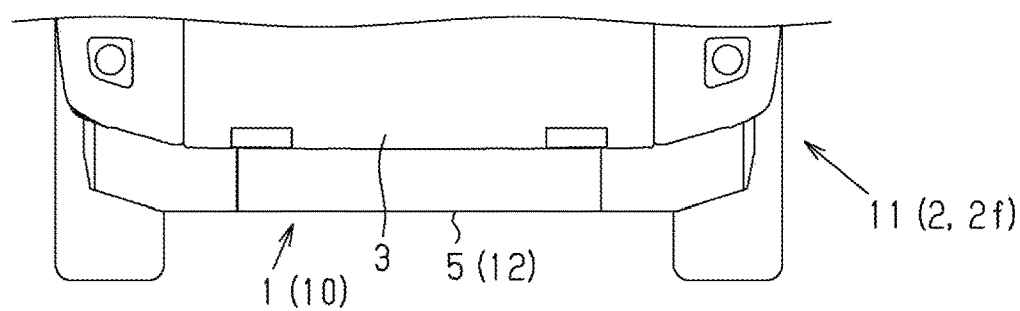
FIG. 1 is a front view of a front spoiler deployed on a lower side of a front bumper.
Figure 2:
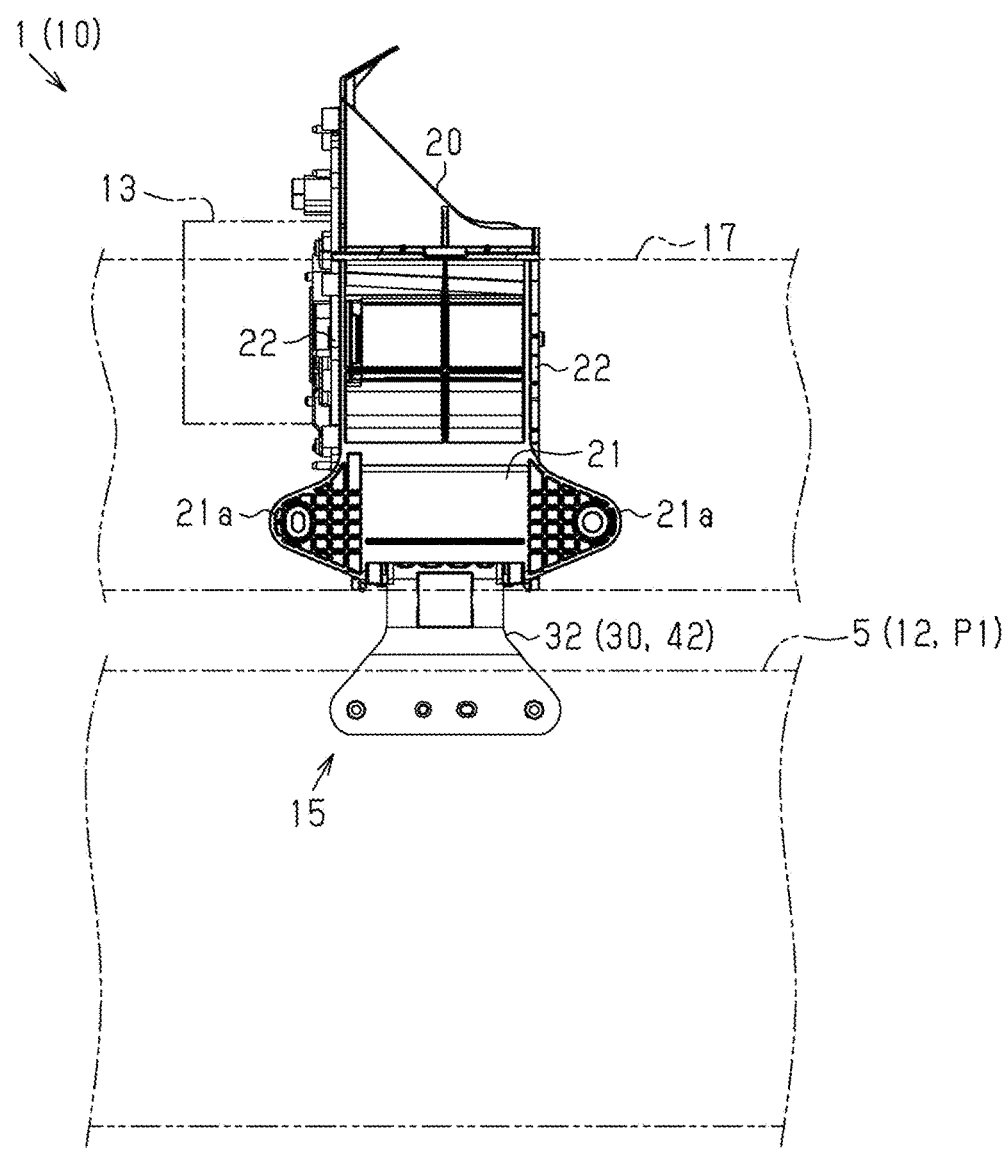
FIG. 2 is a front view of a spoiler device.

As illustrated in FIG. 1, the vehicular aerodynamic device 1 according to this embodiment has a configuration as a spoiler device 10 that deploys a front spoiler 5 to a lower side of a front bumper 3 provided on a front portion 2f of a vehicle body 2 and retracts the front spoiler 5 to a rear side of the front bumper 3.

In a vehicle 11 of this embodiment, the front spoiler 5 as an aerodynamic member 12 has an outer shape of a plate extending in a vehicle width direction (the left-right direction in FIG. 1). Further, the front spoiler 5 is deployed to a lower side of the front bumper 3, and is thereby in a state of extending in an up-down direction. The spoiler device 10 of this embodiment is configured in such a way as to thereby rectify a traveling wind on the vehicle 11, at the front portion 2f of the vehicle body 2.

In other words, the front spoiler 5 deployed to a lower side of the front bumper 3 receives the traveling wind, and thereby, the spoiler device 10 of this embodiment reduces a flow rate of air flowing into a lower side of the vehicle body 2. Thus, the spoiler device 10 has a function of suppressing generation of lift and thereby improving traveling stability of the vehicle 11.

Specifically, as illustrated in FIG. 2 to FIG. 5, the spoiler device 10 of this embodiment includes an actuator 13 whose drive source is an unillustrated motor. The spoiler device 10 includes a link unit 15 that transmits drive force of the actuator 13 to the front spoiler 5. The spoiler device 10 of this embodiment includes a bracket 20 that is fixed to a bumper reinforcement 17 of the vehicle 11, in a state of supporting the actuator 13 and the link unit 15.

Specifically, the bracket 20 of this embodiment includes a base portion 21 fixed to the bumper reinforcement 17. In the bracket 20 of this embodiment, the base portion 21 has an external shape of a substantially flat plate. The base portion 21 includes a pair of fastening portions 21a and 21a that protrude to both sides in the vehicle width direction (the left-right direction in FIG. 2 and FIG. 4, or the direction perpendicular to the paper surface in FIG. 3). The bracket 20 of this embodiment is configured in such a way as to be fixed to the bumper reinforcement 17 by using each of the fastening portions 21a and 21a.

The bracket 20 of this embodiment includes a pair of side wall portions 22 and 22 that face each other in the vehicle width direction. The bracket 20 of this embodiment supports the link unit 15 between the side wall portions 22 and 22. The spoiler device 10 of this embodiment is configured in such a way that the actuator 13 is fixed to one of the side wall portions 22 and 22.

More specifically, the spoiler device 10 of this embodiment includes a drive shaft 23 that extends in the vehicle width direction in a state of traversing over the side wall portions 22 and 22 of the bracket 20. A pinion gear 24 is provided on one end side in an axial direction in the drive shaft 23. Further, in the spoiler device 10 of this embodiment, an output gear (not illustrated in the drawings) of the actuator 13 meshes with the pinion gear 24. The spoiler device 10 of this embodiment is configured such a way that the drive shaft 23 thereby rotates based on drive force of the actuator 13.

The link unit 15 of this embodiment includes a drive link 25 fixed to the drive shaft 23 and thereby rotating integrally with the drive shaft 23. The spoiler device 10 of this embodiment includes a driven shaft 26 that is provided at a lower position separated from the drive shaft 23, in a state of traversing over the side wall portions 22 and 22 of the bracket 20, and that extends in the vehicle width direction. The link unit 15 of this embodiment includes a driven link 27 freely rotatably provided around the driven shaft 26, and an intermediate link 28 freely rotatably coupled to each of the driven link 27 and the drive link 25.

In other words, in the spoiler device 10 of this embodiment, the drive shaft 23 and the driven shaft 26 are arranged in parallel to each other. Further, a coupling shaft 29a coupling the drive link 25 and the intermediate link 28 to each other and a coupling shaft 29b coupling the driven link 27 and the intermediate link 28 to each other are also provided in parallel to the drive shaft 23 and the driven shaft 26, in a state of extending in the vehicle width direction. The link unit 15 of this embodiment is configured in such a way that these respective link members 30 thereby form a four-joint link mechanism.

Further, the link unit 15 of this embodiment includes a connection link 32 that is coupled, as a link member 30 constituting the link unit 15, to the driven link 27 and that thereby rotates integrally with the driven link 27. The spoiler device 10 of this embodiment is configured in such a way that the front spoiler 5 is fixed to the connection link 32.

In other words, in the link unit 15 of this embodiment, rotation of the drive link 25 driven by the actuator 13 is transmitted to the driven link 27 coupled to the drive link 25 via the intermediate link 28. Thereby, the connection link 32 rotates, integrally with the driven link 27, around the driven shaft 26 constituting a coupling shaft 33. The link unit 15 of this embodiment is configured in such a way as to thereby transmit drive force of the actuator 13 to the front spoiler 5 fixed to the connection link 32.

Figure 6:
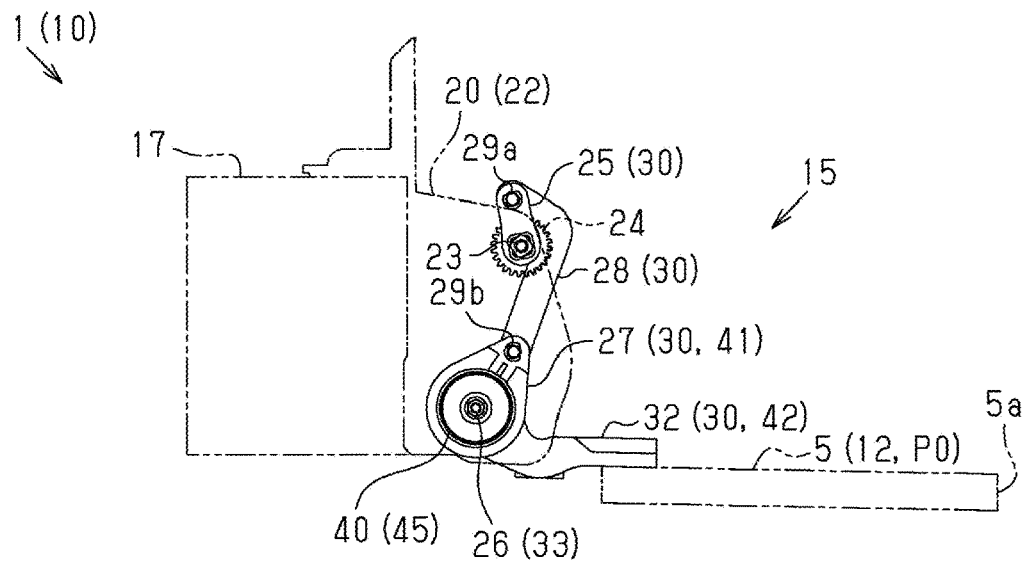
FIG. 6 is an operational illustration of the spoiler device.
Figure 7:
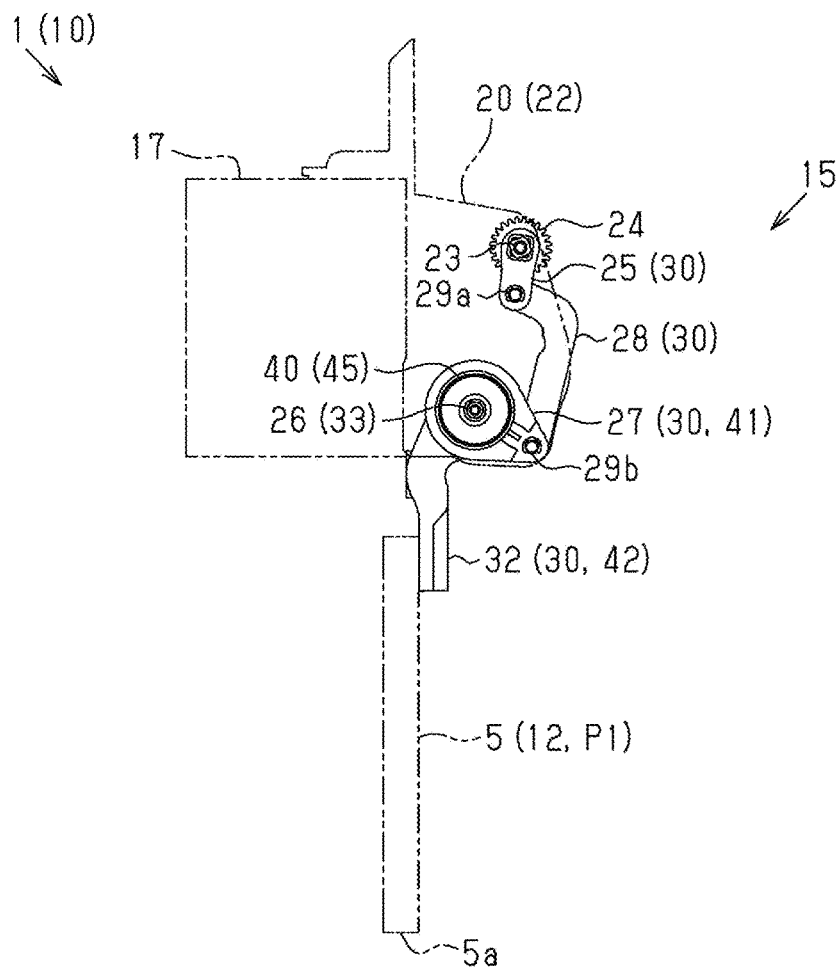
FIG. 7 is an operational illustration of the spoiler device.

More specifically, as illustrated in FIG. 6 and FIG. 7, in the vehicle 11 of this embodiment, the front spoiler 5 is retracted to a rear side of the front bumper 3 in such a way as to be thereby in a state where a distal end 5a thereof faces to a rear side of the vehicle (to the right side in each drawing). The spoiler device 10 of this embodiment is configured in such a way as to deploy the distal end 5a of the front spoiler 5 to a lower side of the front bumper 3, in a form of swinging out the distal end 5a to a front side of the vehicle (to a left side in each drawing).

In other words, in the spoiler device 10 of this embodiment, the drive link 25 rotates clockwise in each drawing, based on drive force of the actuator 13, and thereby, the intermediate link 28 coupled to the drive link 25 is pushed down to a lower side (a lower side in each drawing). Thereby, the connection link 32 constituting an output end of the link unit 15 rotates clockwise in each drawing, and thus, the front spoiler 5 fixed to the connection link 32 moves from a retracted position P0 to a deployed position P1.

In the spoiler device 10, the drive link 25 rotates counterclockwise in each drawing, and thereby, the intermediate link 28 coupled to the drive link 25 is lifted up to an upper side (an upper side in each drawing). Further, the connection link 32 coupled to the intermediate link 28 rotates counterclockwise in each drawing, and thereby, the front spoiler 5 arranged at the deployed position P1 moves to the retracted position P0. The spoiler device 10 of this embodiment is configured in such a way that the front spoiler 5 as the aerodynamic member 12 is thereby deployed and retracted based on drive force of the actuator 13 transmitted via the link unit 15.

The spoiler device 10 of this embodiment deploys the front spoiler 5 when the vehicle 11 is in a high-speed traveling state. The spoiler device 10 holds the front spoiler 5 at the retracted position P0 when the vehicle 11 is in a low-speed traveling state. The spoiler device 10 of this embodiment is configured in such a way as to thereby reduce air resistance of the traveling vehicle 11.

Figure 4:
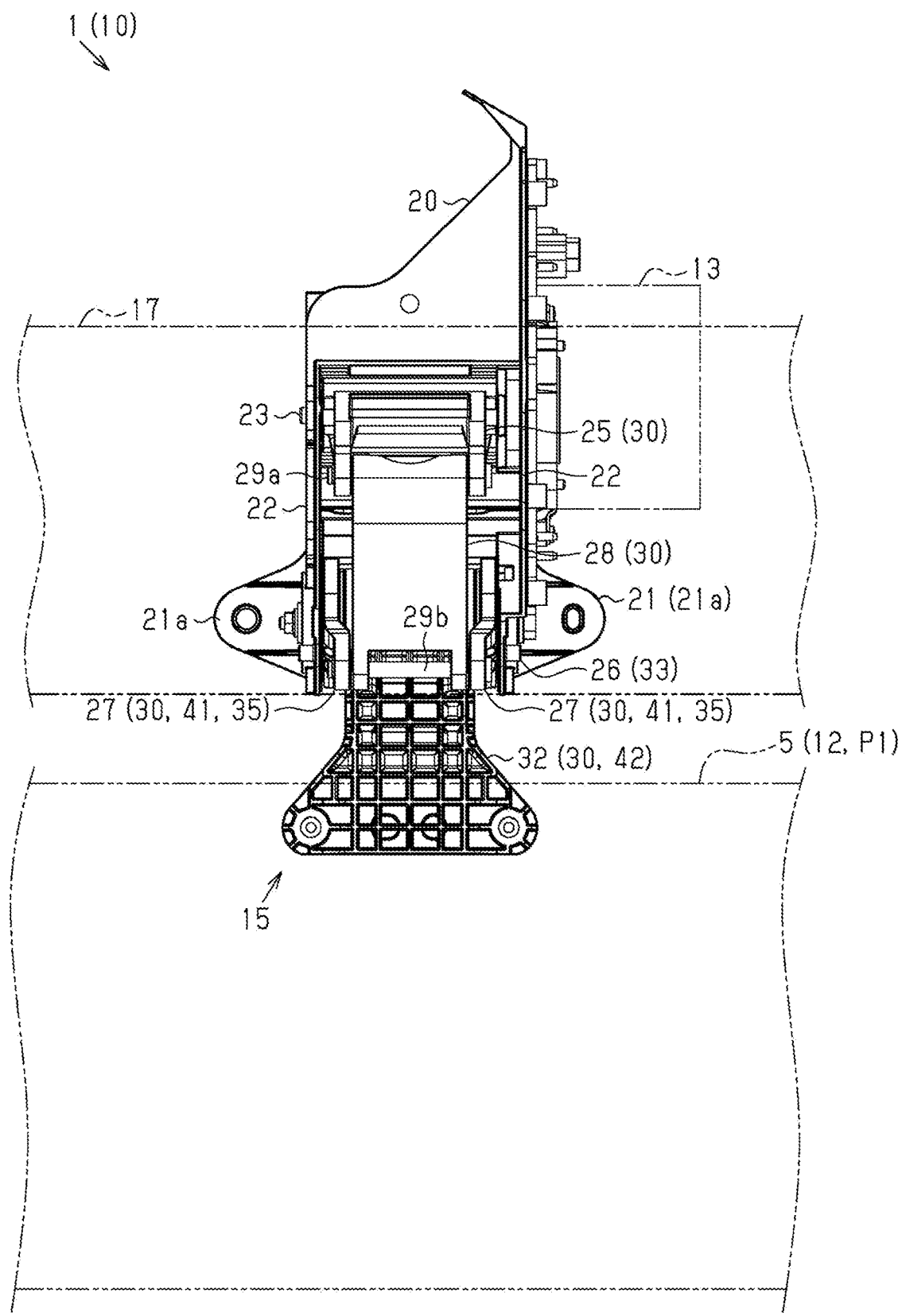
FIG. 4 is a rear view of the spoiler device.
Figure 5:
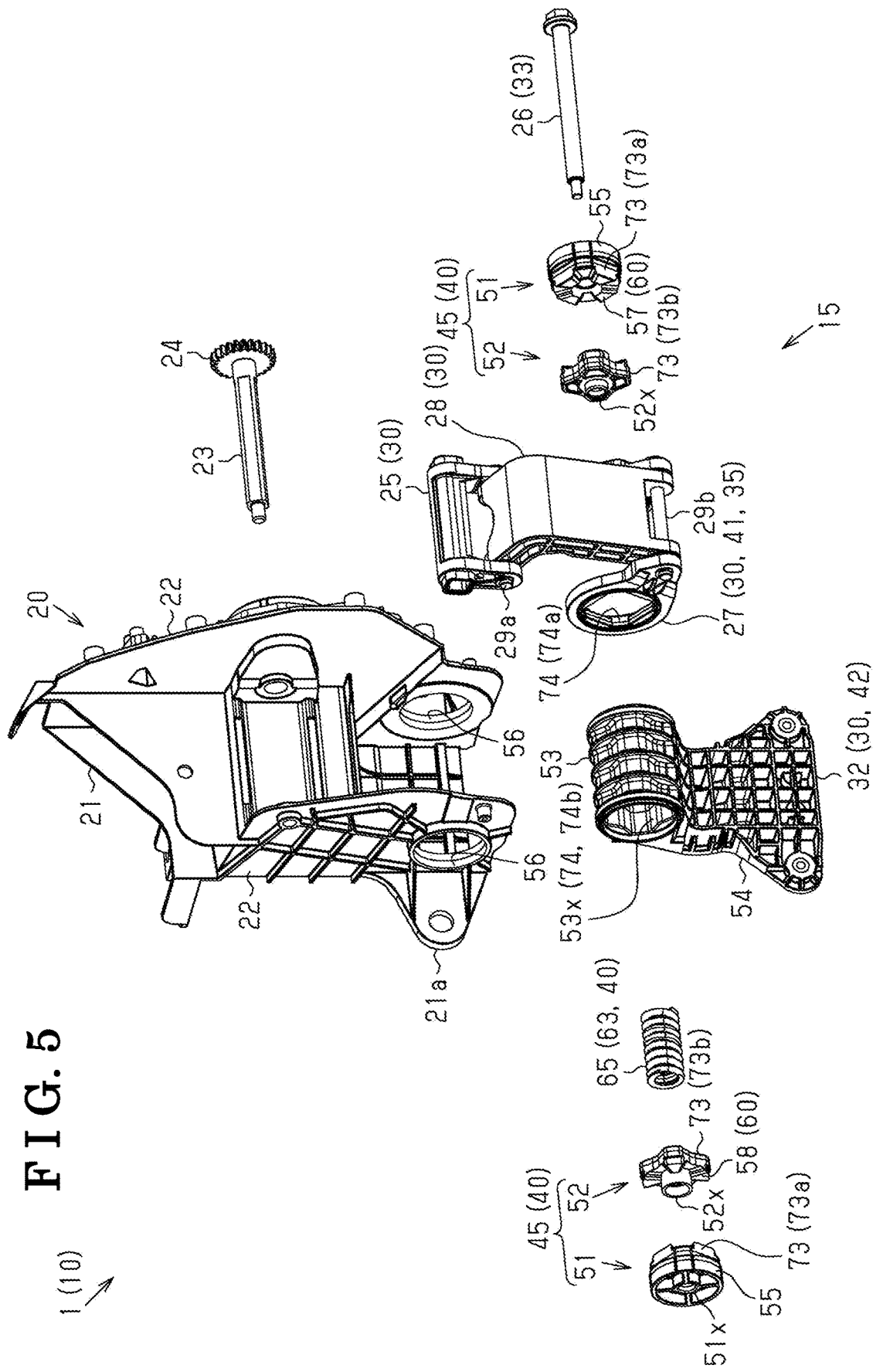
FIG. 5 is an exploded perspective view of the spoiler device.

As illustrated in FIG. 4 and FIG. 5, in the spoiler device 10 of this embodiment, the intermediate link 28 and the connection link 32 constituting the link unit 15 each have a wide shape of extending in the vehicle width direction. The intermediate link 28 of this embodiment has a bent plate shape that is a substantially L-shaped, in order to avoid interference with the drive link 25. The connection link 32 of this embodiment has an enlarged width shape of gradually widening toward a direction away from the driven shaft 26 that constitutes the coupling shaft 33 coupled to the intermediate link 28. The driven link 27 of this embodiment is configured in such a way as to include a pair of division links 35 and 35 that sandwich the intermediate link 28 and the connection link 32 between themselves in a width direction thereof.

In other words, one of the division links 35 and 35 is coupled to each of the intermediate link 28 and the connection link 32, on one end side of the intermediate link 28 and the connection link 32 that extend in the vehicle width direction. The other of the division links 35 and 35 is coupled to each of the intermediate link 28 and the connection link 32, on the other end side of the intermediate link 28 and the connection link 32 in the vehicle width direction. In the spoiler device 10 of this embodiment, a high strength of supporting the front spoiler 5 by the link unit 15 is thereby secured.

As illustrated in FIG. 3 and FIG. 5 to FIG. 7, the spoiler device 10 of this embodiment includes a clutch unit 40 that is interposed between the driven link 27 and the connection link 32 as the link members 30 that constitute the link unit 15.

In other words, in the spoiler device 10 of this embodiment, the driven link 27 to which drive force of the actuator 13 is input constitutes a first link 41, and the connection link 32 to which the front spoiler 5 is fixed constitutes a second link 42. The spoiler device 10 of this embodiment is configured in such a way that the driven link 27 and the connection link 32 integrally rotate based on a function of the clutch unit 40, and thereby, the front spoiler 5 fixed to the connection link 32 is deployed and retracted.

Figure 8:
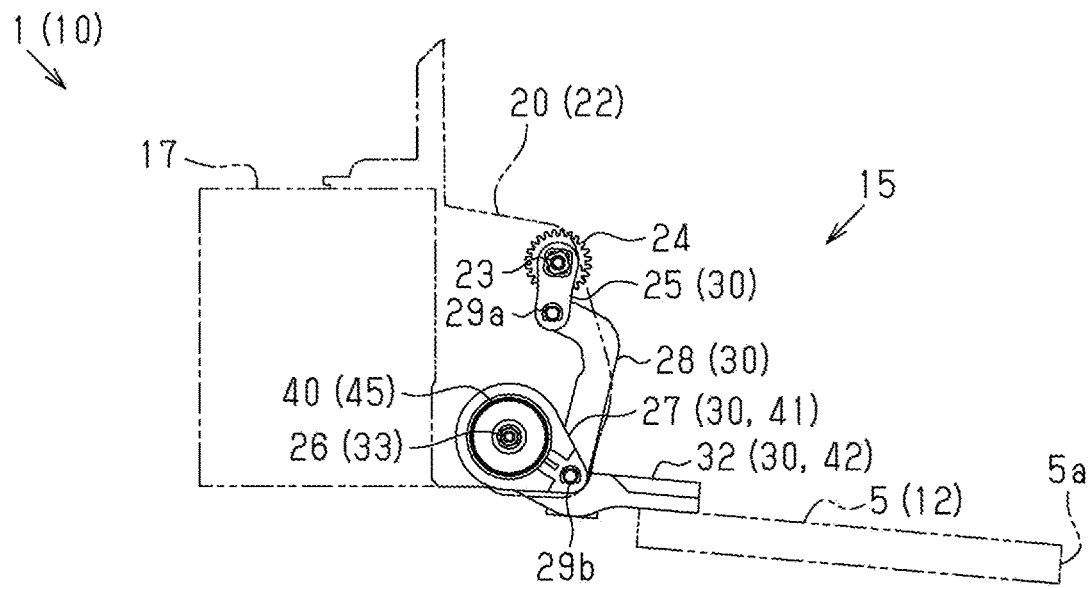
FIG. 8 is an operational illustration of the spoiler device.

As illustrated in FIG. 7 and FIG. 8, the clutch unit 40 of this embodiment has a function of allowing the driven link 27 and the connection link 32 to rotate relative to each other when external force whose magnitude is equal to or larger than a predetermined value is applied to the front spoiler 5 fixed to the connection link 32. In other words, according to link unit 15 of this embodiment, in such a case, only the connection link 32 to which the front spoiler 5 is fixed rotates without being accompanied by operation of the four-joint link mechanism formed by the drive link 25, the driven link 27, and the intermediate link 28. The spoiler device 10 of this embodiment is configured in such a way as to thereby release the external force applied to the front spoiler 5 and thus protect the actuator 13 and each of the link members 30 that constitute the link unit 15.

Specifically, as illustrated in FIG. 5 and FIG. 9 to FIG. 12, the clutch unit 40 of this embodiment includes a pair of clutch mechanisms 45 and 45 that are on the coupling shaft 33 coupling the driven link 27 and the connection link 32 to each other and that are separated from each other in the axial direction of the coupling shaft 33.

Figure 13:
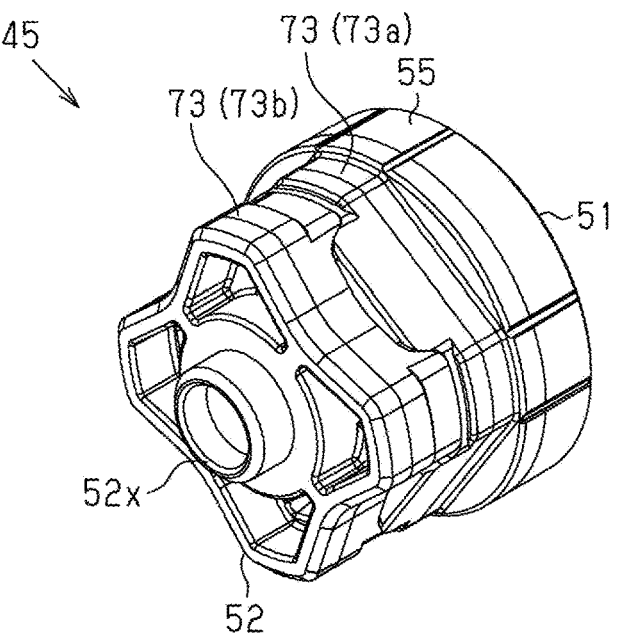
FIG. 13 is a perspective view of a clutch mechanism constituting the clutch unit.
Figure 14:
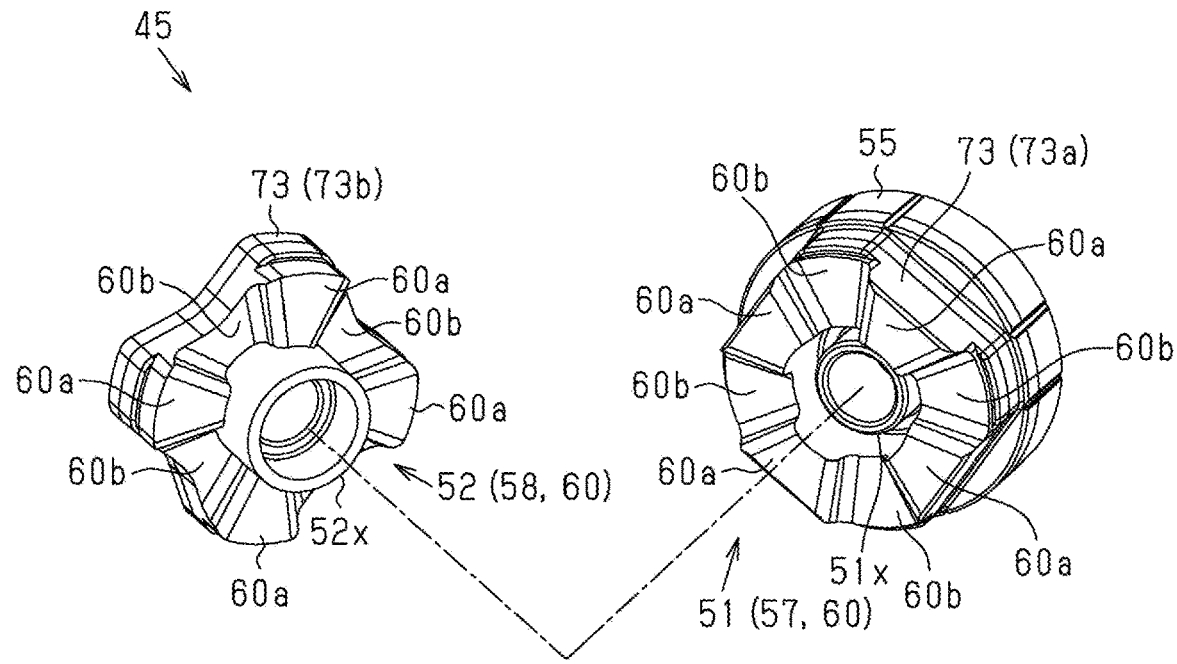
FIG. 14 is a perspective view of a first engagement member and a second engagement member that constitute the clutch mechanism.

As illustrated in FIG. 13 and FIG. 14, in the clutch unit 40 of this embodiment, the respective clutch mechanisms 45 and 45 include first engagement members 51 coupled to the respective division links 35 and 35 that constitute the driven link 27 as the first link 41. Each of these clutch mechanisms 45 and 45 includes a second engagement member 52 coupled to the connection link 32 as the second link 42. The clutch mechanisms 45 and 45 of this embodiment are configured in such a way that the driven link 27 and the front spoiler 5 coupled to each other via the clutch mechanisms 45 and 45 are allowed to be rotated integrally with each other, based on force of engagement between the first engagement member 51 and the second engagement member 52.

Specifically, as illustrated in FIG. 5 and FIG. 9 to FIG. 12, the connection link 32 of this embodiment includes a tubular portion 53 open to both sides in the vehicle width direction, and a plate-shaped portion 54 extending outward in a radial direction of the tubular portion 53. In the spoiler device 10 of this embodiment, the front spoiler 5 is fixed to the plate-shaped portion 54 of the connection link 32. The clutch unit 40 is inserted through an inside of the tubular portion 53 of the connection link 32. Further, in the clutch unit 40 of this embodiment, the respective second engagement members 52 and 52 of the clutch mechanisms 45 and 45 are thereby arranged in openings 53x and 53x of the tubular portion 53 into which the clutch unit 40 is inserted. The clutch unit 40 of this embodiment is configured in such a way that in this state, the second engagement members 52 and 52 of the respective clutch mechanisms 45 and 45 are coupled to the connection link 32, and the first engagement members 51 and 51 are coupled to the respective division links 35 and 35 that constitute the driven link 27.

Figure 12:
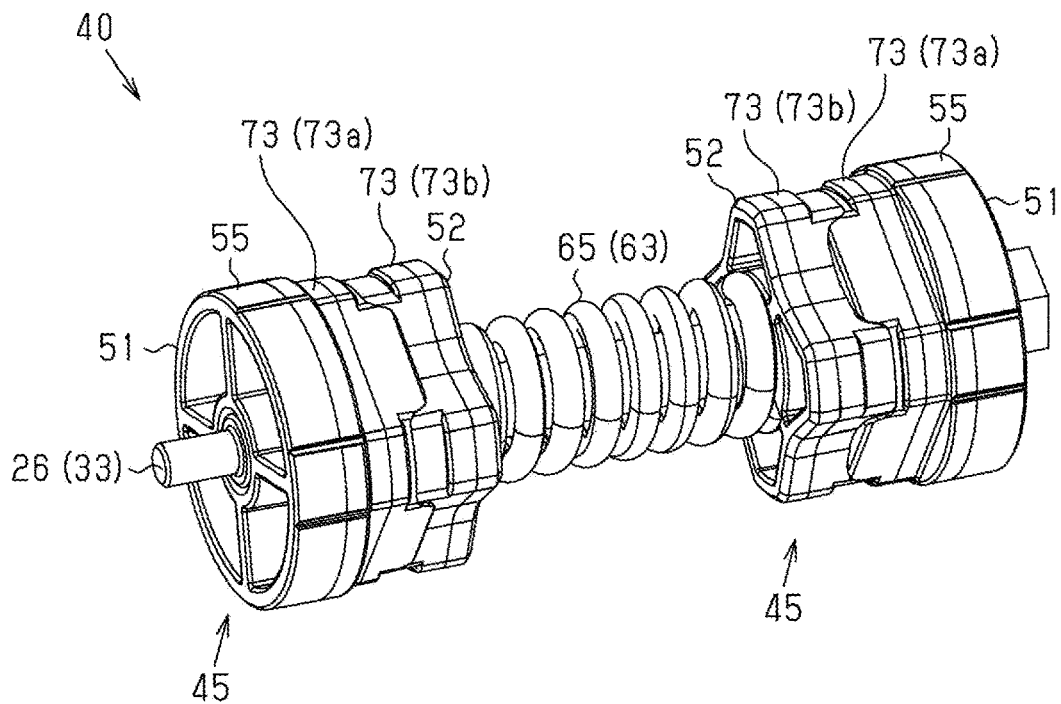
FIG. 12 is a perspective view of the clutch unit.

As illustrated in FIG. 12 to FIG. 14, the first engagement members 51 and 51 constituting the respective clutch mechanisms 45 and 45 of this embodiment each include a cylindrical portion 55 arranged coaxially with the driven shaft 26 that constitutes the coupling shaft 33 coupling the driven link 27 and the connection link 32 to each other.

Figure 3:
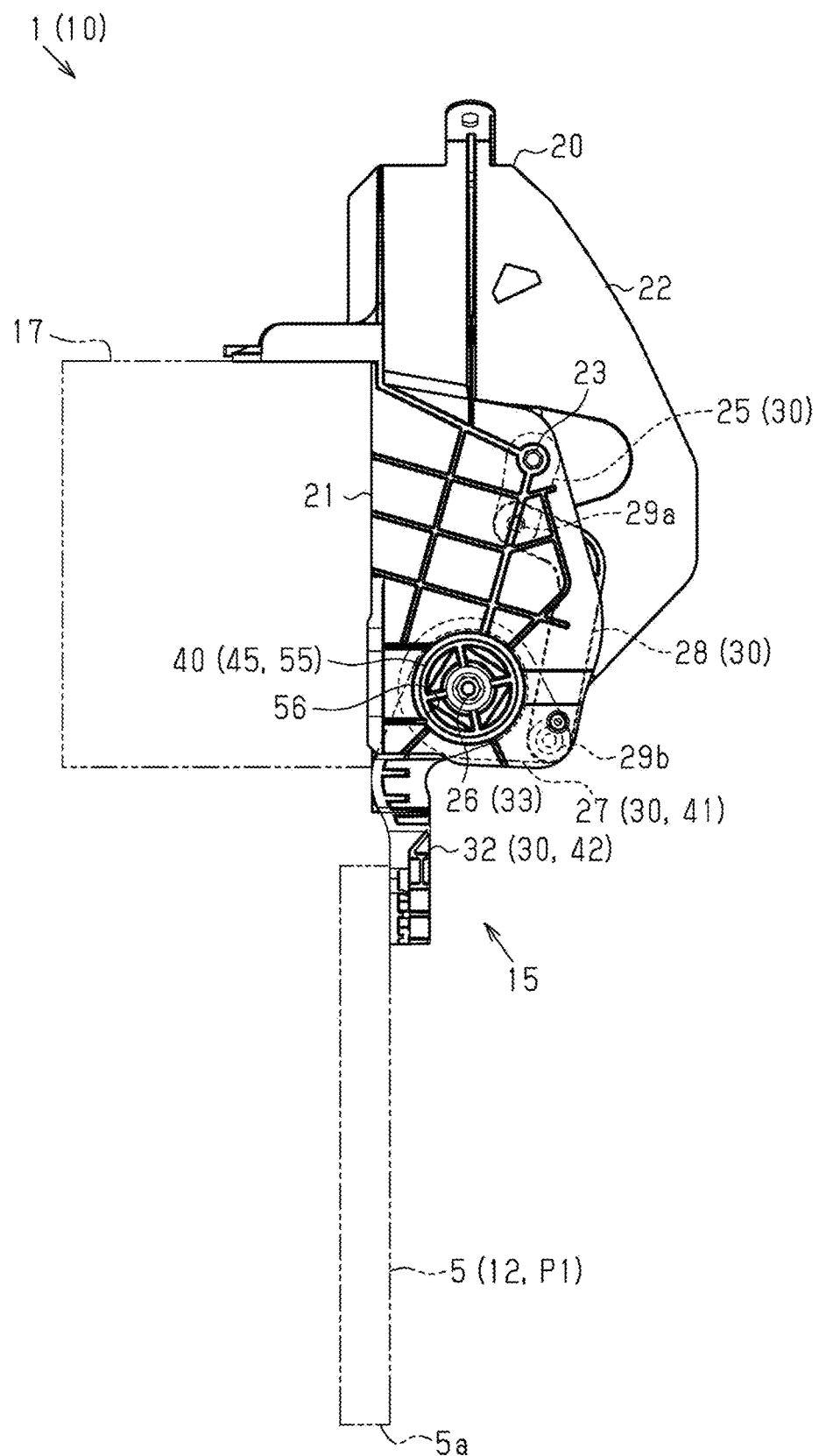
FIG. 3 is a side view of the spoiler device.

Further, as illustrated in FIG. 3 and FIG. 5, the respective side wall portions 22 and 22 of the bracket 20 are provided with a pair of circular hole portions 56 that face each other. The spoiler device 10 of this embodiment is configured in such a way that the cylindrical portions 55 and 55 of the clutch mechanisms 45 and 45 are fitted into the respective circular hole portions 56 and 56, and thereby, the clutch unit 40 is supported by the bracket 20.

In the spoiler device 10 of this embodiment, the cylindrical portions 55 and 55 fitted into the respective circular hole portions 56 and 56 are allowed to slide around the driven shaft 26 that constitutes the coupling shaft 33 coupling the driven link 27 and the connection link 32 to each other. The spoiler device 10 of this embodiment is configured in such a way that the driven link 27 as the first link 41 and the connection link 32 as the second link 42 coupled to each other via the clutch unit 40 are thereby allowed to rotate integrally with each other.

More specifically, as illustrated in FIG. 12 to FIG. 14, in the clutch mechanism 45 of this embodiment, the first engagement member 51 is provided with a tubular portion 51x through which the coupling shaft 33 is inserted. Further, similarly, the second engagement member 52 is also provided with a cylindrical portion 52x through which the coupling shaft 33 is inserted. The clutch mechanism 45 of this embodiment is configured in such a way that the first engagement member 51 and the second engagement member 52 are thereby arranged coaxially with each other in a state of being allowed to rotate relative to each other around the coupling shaft 33.

In the clutch mechanism 45 of this embodiment, a first engagement surface 57 provided in the first engagement member 51 and a second engagement surface 58 provided in a second engagement member 52 are arranged in such a way as to face each other in an axial direction. Further, in the clutch mechanism 45 of this embodiment, the first engagement surface 57 and the second engagement surface 58 are each configured as a cam surface 60 in which a mountain portion 60a and a valley portion 60b are alternately continued around the coupling shaft 33 located at a rotation center thereof. The clutch unit 40 of this embodiment includes a compression coil spring 65 as a biasing member 63 that biases the second engagement member 52 in the axial direction of the coupling shaft 33 and thereby presses the second engagement surface 58 against the first engagement surface 57 of the first engagement member 51 facing the second engagement surface 58 in the axial direction.

Specifically, in the clutch unit 40 of this embodiment, the compression coil spring 65 is arranged between a pair of the clutch mechanisms 45 and 45 separated from each other in the axial direction, in a state where the compression coil spring 65 is fitted to the coupling shaft 33 extending in the vehicle width direction. The clutch unit 40 of this embodiment is configured in such a way that both end portions of the compression coil spring 65 in the axial direction thereby press the respective second engagement members 52 and 52 of the clutch mechanisms 45 and 45 arranged facing each other in the axial direction.

In other words, the respective second engagement members 52 and 52 of the clutch mechanisms 45 and 45 arranged at two positions separated from each other in the axial direction and sandwiching the compression coil spring 65 between themselves are pressed by the compression coil spring 65 of this embodiment in the direction of being separated from each other. The clutch unit 40 of this embodiment is configured in such a way that in each of the clutch mechanisms 45 and 45 separated from each other in the axial direction, the second engagement member 52 biased by the compression coil spring 65 is thereby pressed against the first engagement member 51 facing the second engagement member 52 in the axial direction.

Further, in the clutch mechanism 45 of this embodiment, the first engagement surface 57 of the first engagement member 51 and the second engagement surface 58 of the second engagement member 52 engage with each other, based on biasing force of the compression coil spring 65, in a state where the mountain portion 60a and the valley portion 60b of themselves mesh with each other. The clutch mechanism 45 of this embodiment is configured in such a way that the first engagement member 51 and the second engagement member 52 thereby rotate integrally with each other around the coupling shaft 33, based on force of the engagement between the first engagement surface 57 and the second engagement surface 58 configured as the cam surfaces 60.

Figure 15:
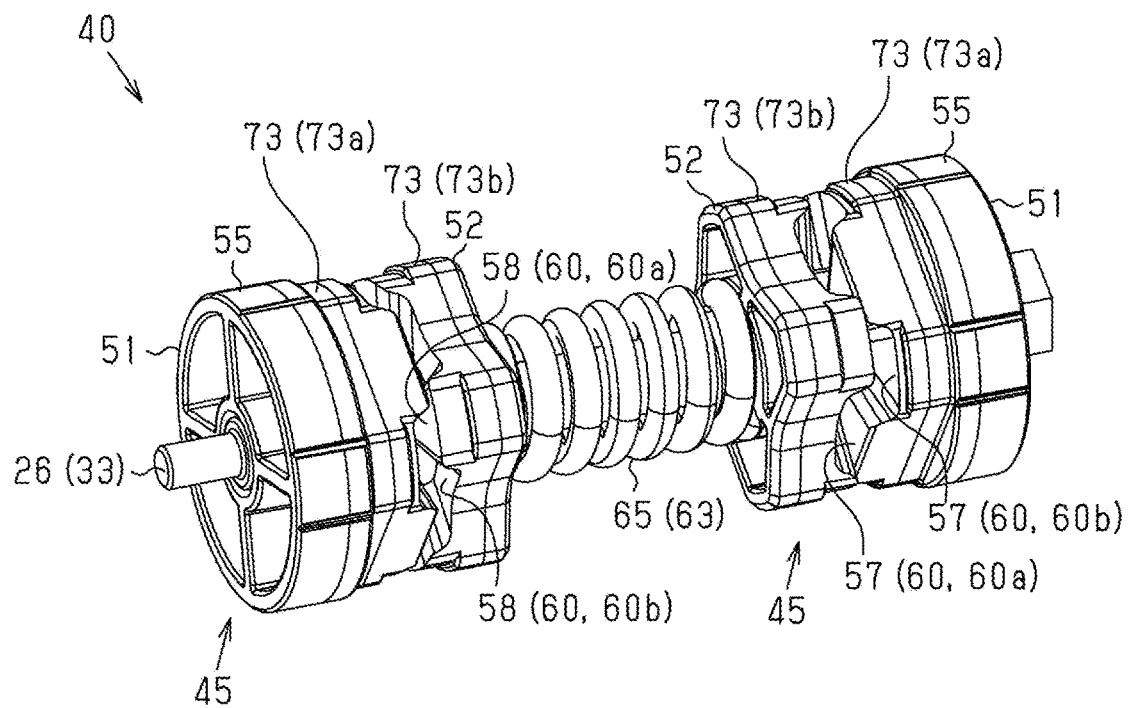
FIG. 15 is a perspective view of the clutch unit.

As illustrated in FIG. 12, FIG. 14, and FIG. 15, the clutch unit 40 of this embodiment allows the first engagement member 51 and the second engagement member 52 of each of the clutch mechanisms 45 and 45 to rotate relative to each other, while accompanied by axial-direction displacement of the second engagement member 52 against biasing force of the compression coil spring 65. In other words, in the clutch unit 40 of this embodiment, the first engagement member 51 and the second engagement member 52 of each of the clutch mechanisms 45 and 45 rotate relative to each other around the coupling shaft 33, in a form where the mountain portion 60a of the first engagement surface 57 and the mountain portion 60a of the second engagement surface 58 move onto each other. Further, the second engagement member 52 of each of the clutch mechanisms 45 and 45 is displaced in the axial direction by the relative rotation of the first engagement member 51 and the second engagement member 52 while compressing the compression coil spring 65. The spoiler device 10 of this embodiment is configured in such a way that the driven link 27 and the connection link 32 thereby rotate relative to each other by the function of the clutch unit 40 when external force whose magnitude is equal to or larger than the predetermined value is applied to the front spoiler 5.

Figure 16:
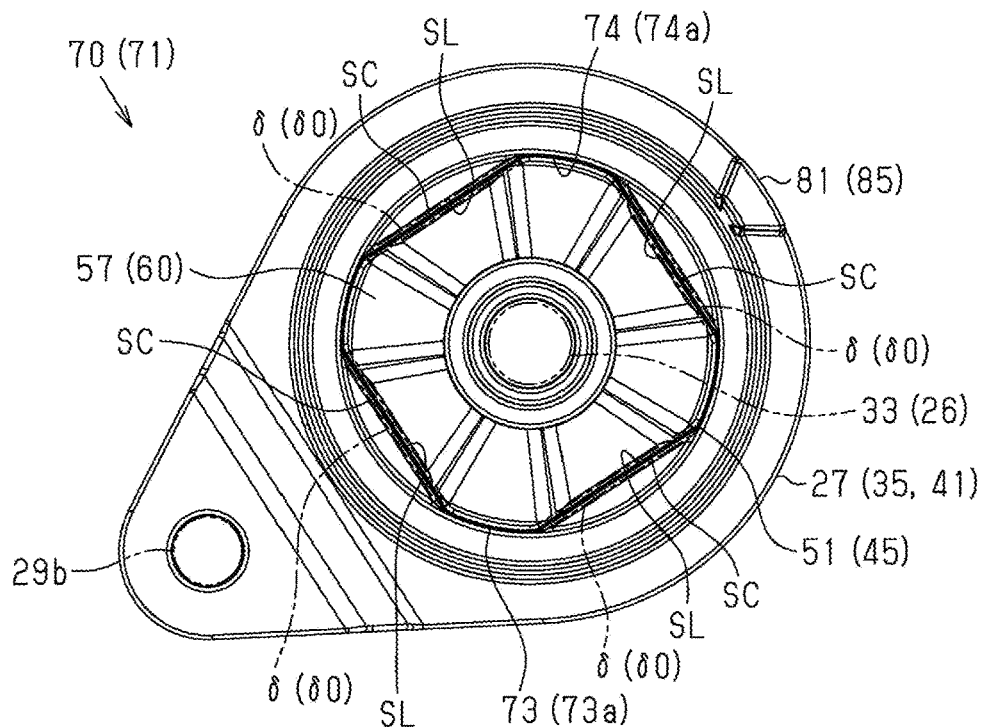
FIG. 16 is a plan view of a first coupling portion having a configuration as a fitting-coupling portion coupling, to each other, the first engagement member of the clutch mechanism and the driven link that constitutes a first link.
Figure 17:
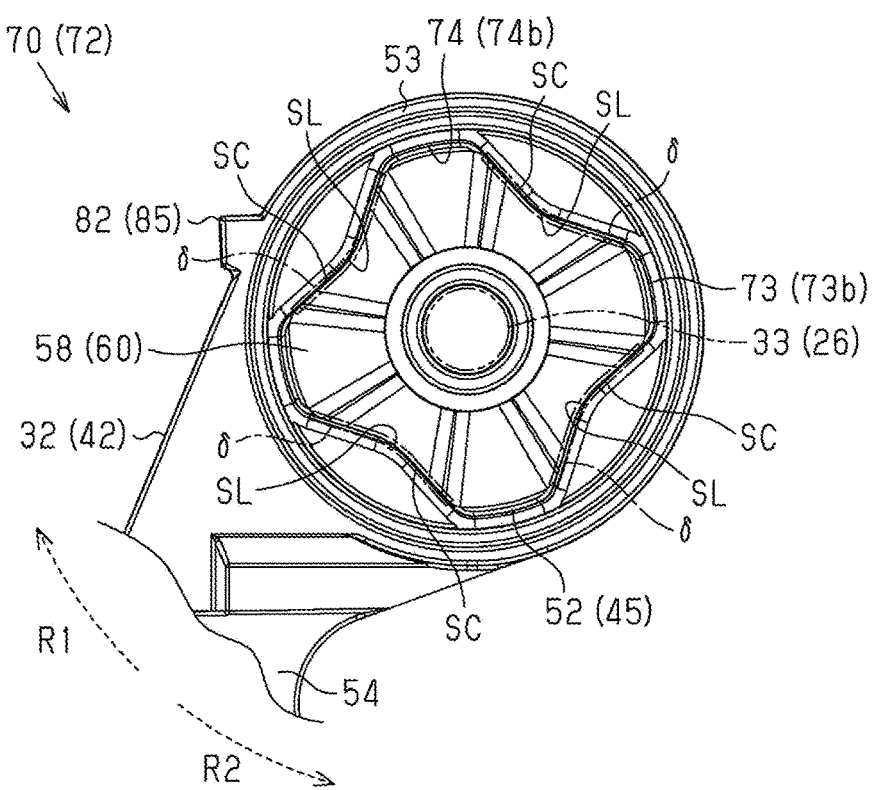
FIG. 17 is a plan view of a second coupling portion having a configuration as a fitting-coupling portion coupling, to each other, the second engagement member of the clutch mechanism and the connection link that constitutes a second link.

As illustrated in FIG. 16 and FIG. 17, the spoiler device 10 of this embodiment includes fitting-coupling portion 70 that couples the first engagement member 51 and the second engagement member 52 of each of the clutch mechanisms 45 and 45 integrally to the driven link 27 and the connection link 32, respectively.

Specifically, a first coupling portion 71 having a configuration as the fitting-coupling portion 70 and coupling the driven link 27 and the first engagement member 51 to each other includes a clutch-side engagement surface SC and a link-side engagement surface SL that rotate around the coupling shaft 33. Similarly, a second coupling portion 72 having a configuration as the fitting-coupling portion 70 and coupling the connection link 32 and the second engagement member 52 to each other also includes a clutch-side engagement surface SC and a link-side engagement surface SL that rotate around the coupling shaft 33. The spoiler device 10 of this embodiment is configured in such a way that the clutch-side engagement surfaces SC engage with the link-side engagement surfaces SL, and thereby, the driven link 27 and the first engagement member 51 rotate integrally with each other, and the connection link 32 and the second engagement member 52 rotate integrally with each other.

Specifically, in the spoiler device 10 of this embodiment, the first engagement member 51 and the second engagement member 52 of each of the clutch mechanisms 45 and 45 each include a fitting portion 73 having a polygonal cross-section that includes a plurality of the clutch-side engagement surfaces SC at an outer periphery thereof. The division links 35 and 35 constituting the driven link 27 and width-direction both ends of the connection link 32 are each provided with a polygonal fitting hole 74 that includes a plurality of the link-side engagement surfaces SL at an inner periphery thereof. In the spoiler device 10 of this embodiment, the openings 53x and 53x of the tubular portion 53 into which the clutch unit 40 is inserted form the fitting holes 74 and 74 at the width-direction both ends of the connection link 32 (refer to FIG. 5). The spoiler device 10 of this embodiment is configured in such a way that the fitting portions 73 and the fitting holes 74 engage with each other, thereby forming the first coupling portions 71 and the second coupling portions 72 having the configurations as the fitting-coupling portions 70.

Figure 18:
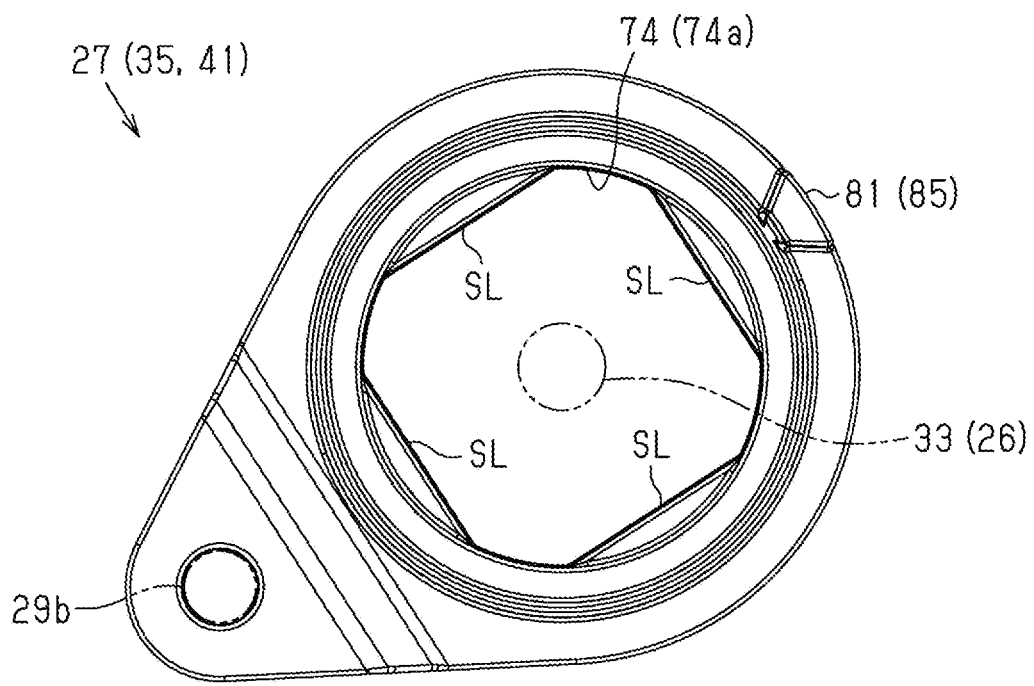
FIG. 18 is a plan view of the driven link.
Figure 19:
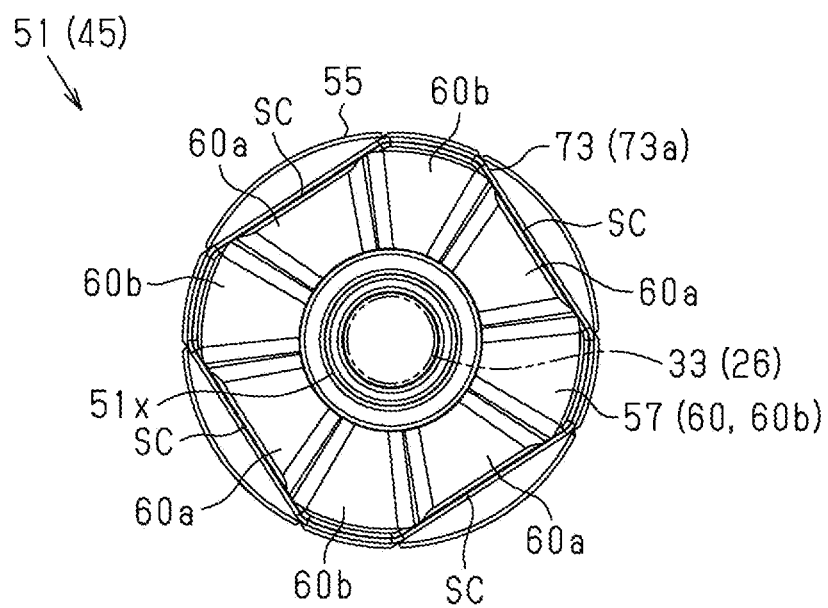
FIG. 19 is a plan view of the first engagement member.

More specifically, as illustrated in FIG. 16, FIG. 18, and FIG. 19, in the spoiler device 10 of this embodiment, the fitting hole 74a provided in the driven link 27 has a substantially quadrilateral hole shape that includes the four link-side engagement surfaces SL provided at the inner periphery thereof at equal angular intervals. The first engagement member 51 of the clutch mechanism 45 is provided with the fitting portion 73a having a substantially quadrilateral cross section that includes, at the outer periphery thereof, the four clutch-side engagement surfaces SC engaging with the respective link-side engagement surfaces SL. The spoiler device 10 of this embodiment is configured in such a way that the engagement between the fitting portion 73a and the fitting hole 74a forms the first coupling portion 71 having the configuration as the fitting-coupling portion 70.

Figure 20:
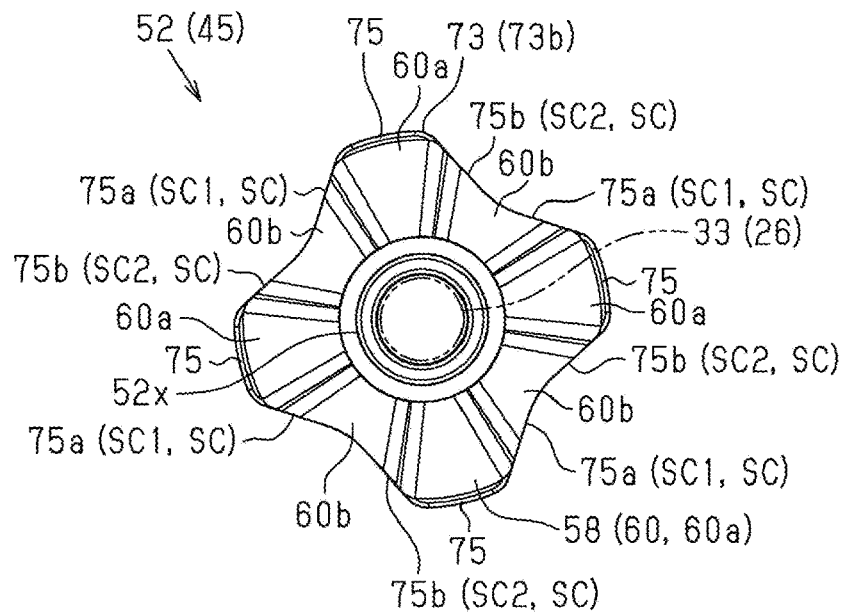
FIG. 20 is a plan view of the second engagement member.
Figure 21:
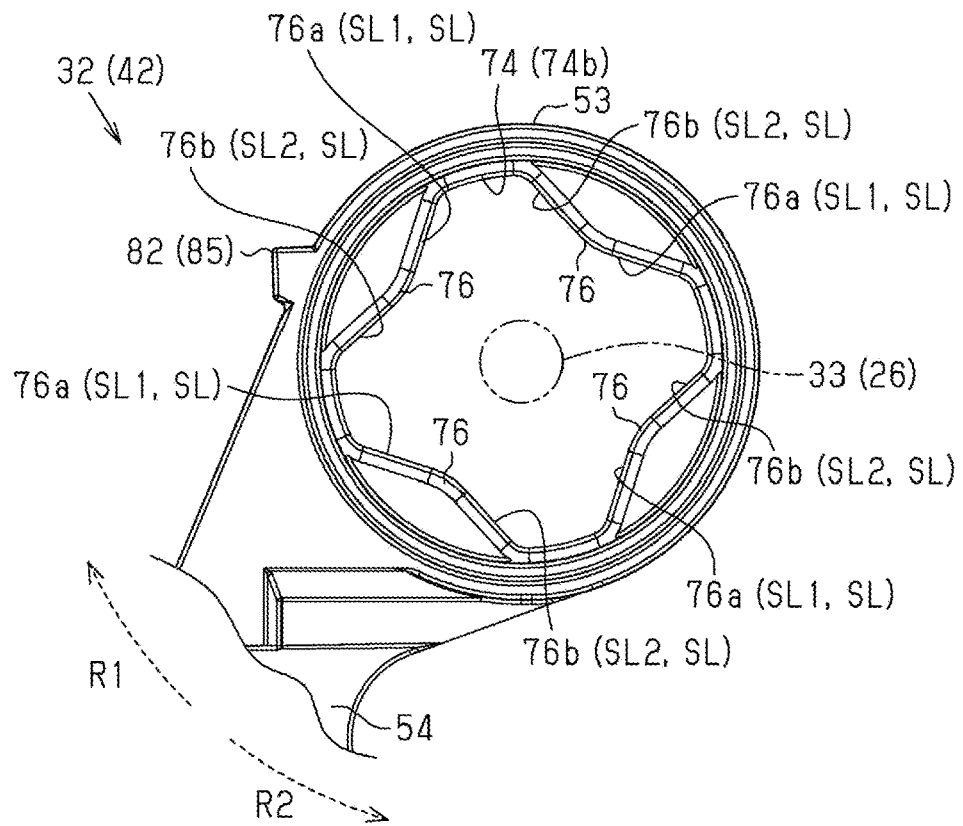
FIG. 21 is a plan view of the connection link.

Meanwhile, as illustrated in FIG. 17, FIG. 20, and FIG. 21, the fitting portion 73b provided in the second engagement member 52 of the clutch mechanism 45 includes four outward protrusion portions 75 provided at the outer periphery thereof at equal angular intervals and protruding outward in a radial direction. Further, the fitting hole 74b provided in the connection link 32 also includes four inward protrusion portions 76 provided at the inner periphery thereof at equal angular intervals. The spoiler device 10 of this embodiment is configured in such a way that the engagement between the fitting portion 73b and the fitting hole 74b forms the second coupling portion 72 having the configuration as the fitting-coupling portion 70.

Specifically, in the spoiler device 10 of this embodiment, when viewed in the axial direction (the direction perpendicular to the paper surface in FIG. 20), each of the outward protrusion portions 75 that constitute the fitting portion 73b of the second engagement member 52 has a substantially trapezoidal shape that includes a shorter edge on a radial-direction outer side. Similarly, when viewed in the axial direction (the direction perpendicular to the paper surface in FIG. 21), each of the inward protrusion portions 76 that constitute the fitting hole 74b of the connection link 32 has a substantially triangular shape that is tapered inward in the radial direction. The spoiler device 10 of this embodiment is configured in such a way that the fitting portion 73b of the second engagement member 52 and the fitting hole 74b of the connection link 32 are fitted to each other in a state where the respective outward protrusion portions 75 engage with the respective inward protrusion portions 76.

In other words, in the spoiler device 10 of this embodiment, oblique edges 75a and 75b of each outward protrusion portion 75 having the substantially trapezoidal shape form clutch-side engagement surfaces SC1 and SC2 of the second coupling portion 72 having the configuration as the fitting-coupling portion 70. Oblique edges 76a and 76b of each inward protrusion portion 76 having the substantially triangular shape form link-side engagement surfaces SL1 and SL2 of the second coupling portion 72. The second coupling portion 72 is configured in such a way that the second engagement member 52 and the connection link 32 rotate integrally with each other in a state where the clutch-side engagement surface SC1 and the link-side engagement surface SL1 engage with each other, or the clutch-side engagement surface SC2 and the link-side engagement surface SL2 engage with each other.

More specifically, in the spoiler device 10 of this embodiment, the front spoiler 5 is deployed by clockwise rotation of the connection link 32 in each of FIG. 17, FIG. 20, and FIG. 21. The front spoiler 5 is retracted by counterclockwise rotation of the connection link 32.

In other words, when the front spoiler 5 is deployed based on drive force of the actuator 13, the second engagement member 52 and the connection link 32 rotate integrally with each other in a state where the clutch-side engagement surface SC2 and the link-side engagement surface SL2 engage with each other in the second coupling portion 72. When the front spoiler 5 is retracted based on drive force of the actuator 13, the second engagement member 52 and the connection link 32 rotate integrally with each other in a state where the clutch-side engagement surface SC1 and the link-side engagement surface SL1 engage with each other in the second coupling portion 72.

As illustrated in FIG. 16 and FIG. 17, the spoiler device 10 of this embodiment includes a gap δ provided between the clutch-side engagement surface SC and the link-side engagement surface SL, for each of the first coupling portion 71 and the second coupling portion 72 that have the configurations as the fitting-coupling portions 70. Further, in the spoiler device 10 of this embodiment, the gap δ in the second coupling portion 72 is generated in such a way as to be larger than that in the first coupling portion 71. The spoiler device 10 of this embodiment is configured in such a way as to thereby allow axial-direction displacement of the second engagement member 52 coupled to the connection link 32 in the second coupling portion 72.

Figure 22:
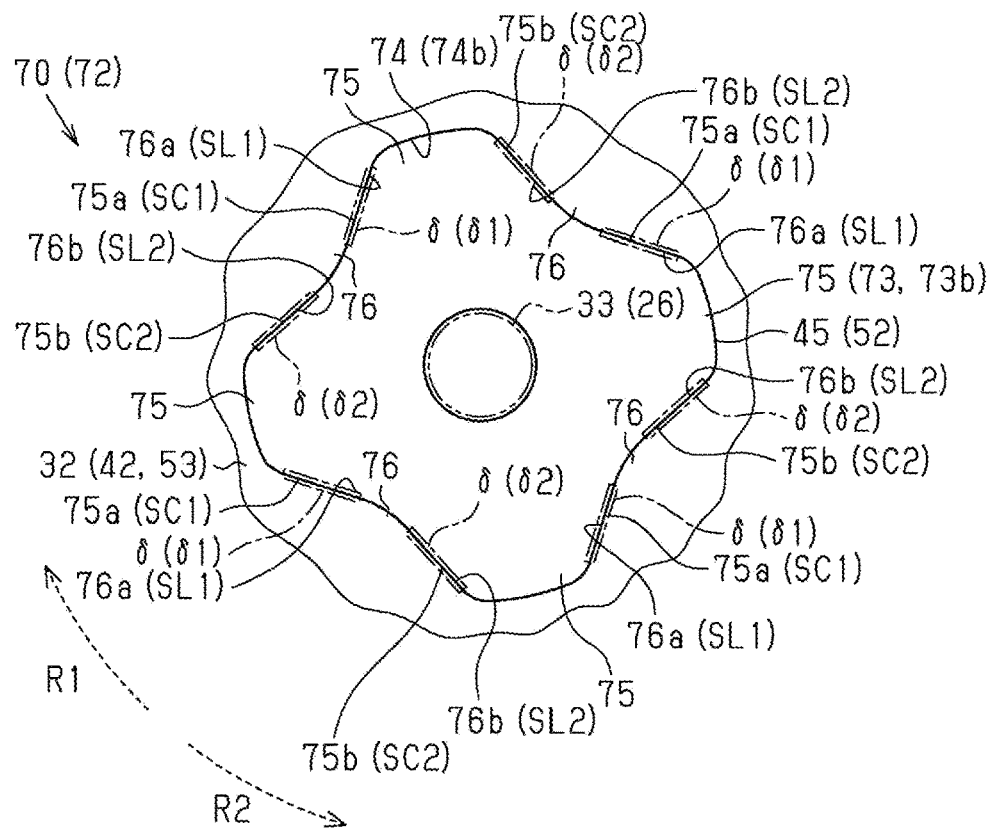
FIG. 22 is an illustration of first and second gaps generated in the second coupling portion.

Herein, as illustrated in FIG. 17, FIG. 21, and FIG. 22, a first relative rotation direction R1 is assumed to be a direction in which the driven link 27 and the connection link 32 rotate relative to each other when external force of displacing the front spoiler 5 in a deployment direction is applied. A second relative rotation direction R2 is assumed to be a direction in which the driven link 27 and the connection link 32 rotate relative to each other when external force of displacing the front spoiler 5 in a retraction direction is applied. In each of the drawings, the arrows indicating the first and second relative rotation directions R1 and R2 indicate rotation directions of the connection link 32 to which the front spoiler 5 is fixed. Further, a first gap δ1 is assumed to be the gap δ between the clutch-side engagement surface SC1 and the link-side engagement surface SL1 that engage with each other in the first relative rotation direction R1. A second gap δ2 is assumed to be the gap δ between the clutch-side engagement surface SC2 and the link-side engagement surface SL2 that engage with each other in the second relative rotation direction R2. The spoiler device 10 of this embodiment is configured in such a way that the second gap δ2 is narrower than the first gap δ1. Specifically, when the front spoiler 5 is at a deployed position P1 in a no-load state, the second gap δ2 is narrower than the first gap δ1.

Specifically, in the spoiler device 10 of this embodiment, each of the outward protrusion portions 75 that constitute the fitting portion 73b of the second engagement member 52 includes a portion on a side of the oblique edge 75a and a portion on a side of the oblique edge 75b that are asymmetric to each other when the outward protrusion portion 75 is divided into two of the portion on a side of the oblique edge 75a and the portion on a side of the oblique edge 75b. Specifically, in the circumferential direction of the fitting portion 73b, the portion on a side of the oblique edge 75b forming the one clutch-side engagement surface SC2 is slightly larger than the portion on a side of the oblique edge 75a forming another clutch-side engagement surface SC1. In the spoiler device 10 of this embodiment, the second gap δ2 formed between the clutch-side engagement surface SC2 and the link-side engagement surface SL2 is thereby narrower than the first gap δ1 formed between the clutch-side engagement surface SC1 and the link-side engagement surface SL1.

In other words, in the spoiler device 10 of this embodiment, a size of a retraction-direction backlash generated in the front spoiler 5, based on the gaps δ generated in the second coupling portion 72 having the configuration as the fitting connection portion 70 is smaller than a size of a deployment-direction backlash thereof. The spoiler device 10 of this embodiment is configured in such a way as to thereby suppress displacement of the front spoiler 5 pressed by the wind pressure in the retraction direction, thus securing high aerodynamic performance.

In the spoiler device 10 of this embodiment, a gap δ0 corresponding to a dimensional tolerance is formed between the clutch-side engagement surface SC and the link-side engagement surface SL, concerning the first coupling portion 71 also having the configuration as the fitting-coupling portion 70. For example, the dimensional tolerance is set to the minimum value in consideration of a variation at the time of manufacturing the components and expansion and contraction caused by a change of an environment such as humidity and temperature. The spoiler device 10 of this embodiment is configured in such a way as to thereby suppress generation of a backlash in the first coupling portion 71.

Figure 9:
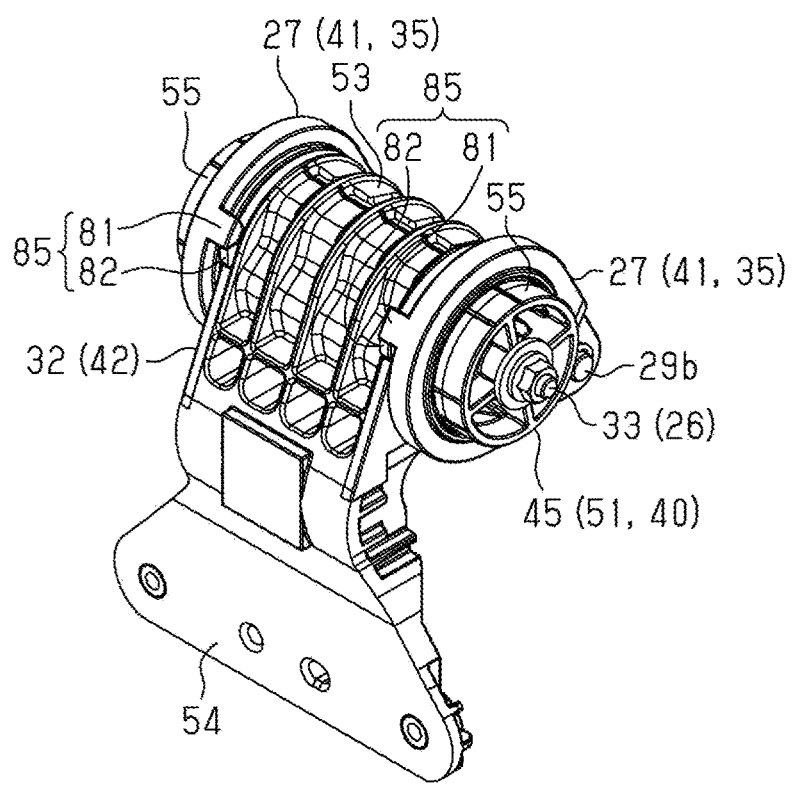
FIG. 9 is a perspective view of a driven link and a connection link coupled to each other via a clutch unit.
Figure 10:
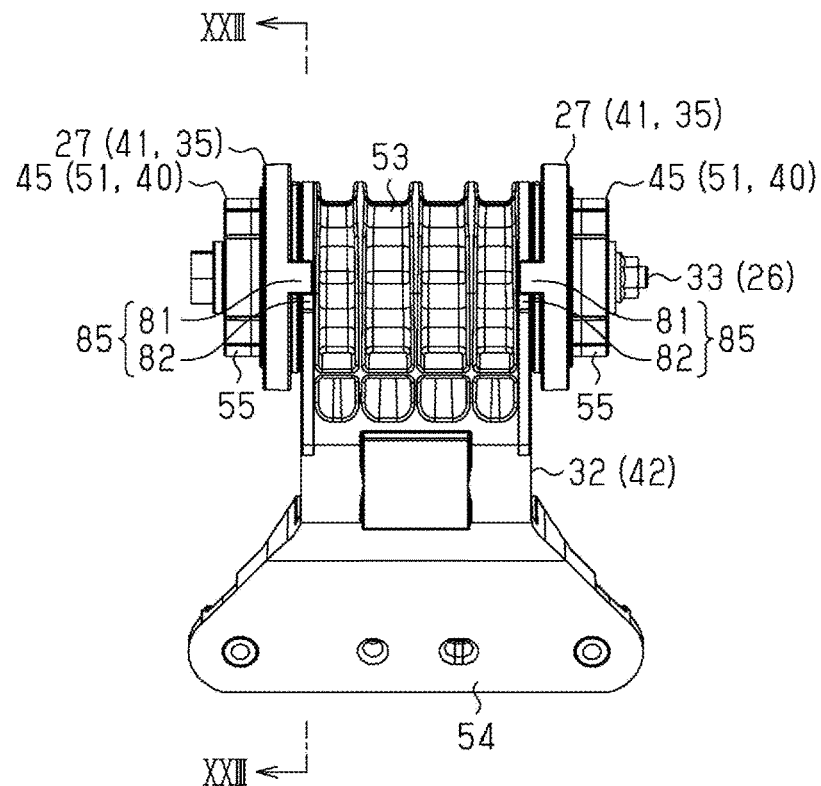
FIG. 10 is a front view of the driven link and the connection link coupled to each other via the clutch unit.
Figure 11:
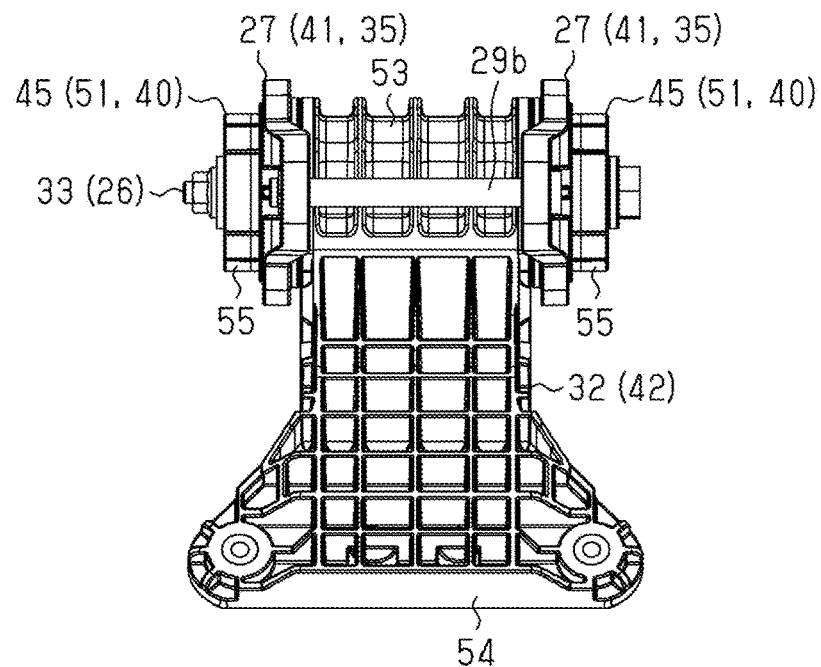
FIG. 11 is a rear view of the driven link and the connection link coupled to each other via the clutch unit.
Figure 23:
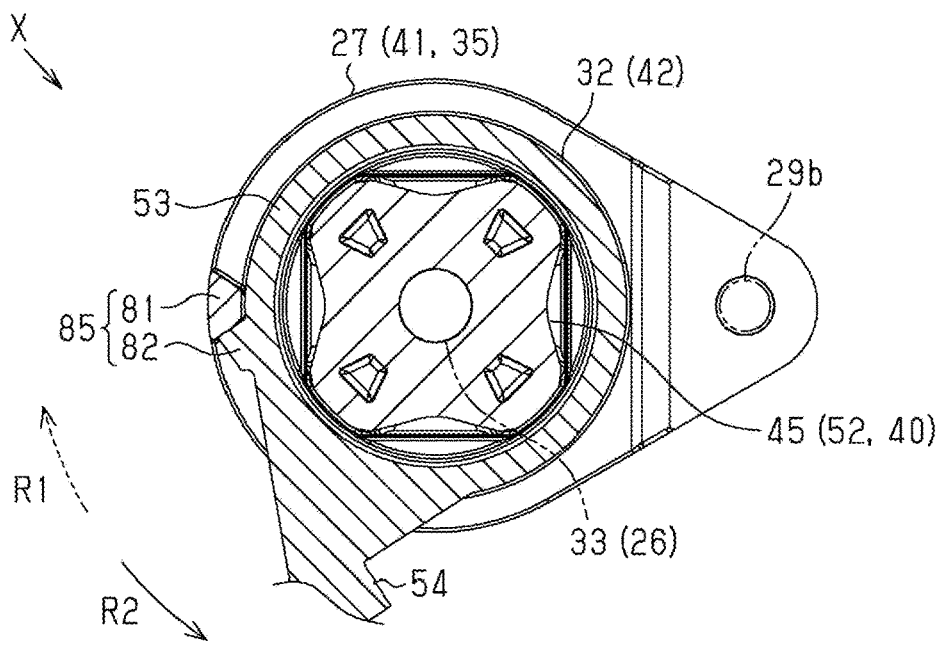
FIG. 23 is a cross-sectional view of the spoiler device near a stopper mechanism.

As illustrated in FIG. 9, FIG. 10, and FIG. 23, the spoiler device 10 of this embodiment includes a first stopper portion 81 that is provided in the driven link 27 constituting the first link 41, and a second stopper portion 82 that is provided in the connection link 32 constituting the second link 42. Further, the first stopper portion 81 and the second stopper portion 82 are configured in such a way as to engage with each other at a relative rotation position X of the driven link 27 and the connection link 32 at which the driven link 27 and the connection link 32 coupled to each other via the clutch unit 40 rotate integrally with each other. A stopper mechanism 85 that restricts, in the first relative rotation direction R1, relative rotation between the driven link 27 as the first link 41 and the connection link 32 as the second link 42 is thereby formed in the spoiler device 10 of this embodiment.

Specifically, the spoiler device 10 of this embodiment includes a pair of the first stopper portions 81 and 81 provided in the respective division links 35 and 35 that constitute the driven links 27. The spoiler device 10 includes a pair of the second stopper portions 82 and 82 provided in the connection link 32, at two positions separated from each other in the axial direction of the coupling shaft 33. Further, the respective first stopper portions 81 and 81 and the respective second stopper portions 82 and 82 are configured in such a way as to contact against each other in the first relative rotation direction R1. The spoiler device 10 of this embodiment is configured in such a way that the respective first stopper portions 81 and 81 and the respective second stopper portions 82 and 82 form a pair of stopper mechanisms 85 and 85 separated from each other in the axial direction of the coupling shaft 33.

Specifically, in the spoiler device 10 of this embodiment, the first stopper portions 81 and 81 are provided at positions facing each other in the axial direction of the coupling shaft 33, in such a way as to protrude in the axial direction of the coupling shaft 33 from peripheral edge portions of the respective division links 35 and 35. The second stopper portions 82 and 82 are provided at width-direction both end portions of the connection link 32 in such a way as to protrude outward in a radial direction from the tubular portion 53. The spoiler device 10 of this embodiment is configured in such a way that a pair of the stopper mechanisms 85 and 85 are thereby formed at the two positions that sandwich, between themselves in the vehicle width direction, the connection link 32 to which the front spoiler 5 is fixed.

In other words, the stopper mechanism 85 of this embodiment restricts relative rotation between the driven link 27 and the connection link 32 in the above-described first relative rotation direction R1 by engagement between the first stopper portion 81 and the second stopper portion 82, in a normal state in which external force whose magnitude is equal to or larger than the predetermined value is not applied. The spoiler device 10 of this embodiment is configured in such a way as to be thereby capable of suppressing, at each of the retracted position P0 and the deployed position P1, rattling of the front spoiler 5 that is based on the gaps δ generated in the second coupling portion 72.

Further, according to the stopper mechanism 85 of this embodiment, when the driven link 27 and the connection link 32 rotate relative to each other in the second relative rotation direction R2, the first stopper portion 81 and the second stopper portion 82 are separated from each other in the circumferential direction. In other words, the stopper mechanism 85 of this embodiment allows the driven link 27 and the connection link 32 to rotate relative to each other in the second relative rotation direction R2, based on the function of the clutch unit 40. The spoiler device 10 of this embodiment is configured in such a way that the front spoiler 5 can be thereby displaced in the retraction direction when external force whose magnitude is equal to or larger than the predetermined value is applied to the front spoiler 5.

Next, an effect of this embodiment is described.

In other words, the second coupling portion 72 having the configuration as the fitting-coupling portion 70 and coupling, to each other, the connection link 32 and the second engagement member 52 of each of the clutch mechanisms 45 and 45 includes the gaps δ generated between the clutch-side engagement surfaces SC and the link-side engagement surfaces SL. Further, concerning the gaps δ, the second gap δ2 in the second relative rotation direction R2 in which the front spoiler 5 is displaced in the retraction direction by the application of external force is generated in such a way as to be narrower than the first gap δ1 in the first relative rotation direction R1 in which the front spoiler 5 is displaced in the deployment direction by the application of external force (δ2<δ1). As a result, retraction-direction displacement caused by traveling wind that the front spoiler 5 receives is suppressed in a state where the front spoiler 5 is arranged at the deployment position P1.

Next, advantageous effects of this embodiment are described.

(1) The spoiler device 10 as the vehicular aerodynamic device 1 includes the link unit 15 that is configured by coupling a plurality of the link members 30 to each other, and the front spoiler 5 as the aerodynamic member 12 that is deployed and retracted based on drive force transmitted via the link unit 15. The link unit 15 transmits drive force to the front spoiler 5 by integral rotation of the first link 41 and the second link 42 as the link members 30 that are coupled to each other via the clutch mechanism 45. The clutch mechanism 45 includes the first engagement member 51 coupled to the driven link 27 as the first link 41, and the second engagement member 52 coupled to the connection link 32 as the second link 42. The first engagement member 51 and the second engagement member 52 rotate integrally with each other around the coupling shaft 33 by engaging with each other, and rotate relative to each other by external force applied to the front spoiler 5 and larger than force of the mutual engagement. Further, the second coupling portion 72 coupling the connection link 32 and the second engagement member 52 to each other has the configuration as the fitting-coupling portion 70 including the clutch-side engagement surface SC and the link-side engagement surface SL that rotate integrally with each other around the coupling shaft 33 by engaging with each other. The second coupling portion 72 includes the first gap δ1 generated between the clutch-side engagement surface SC1 and the link-side engagement surface SL1 in the first relative rotation direction R1 in which the front spoiler 5 is displaced in the deployment direction, based on external force. The second coupling portion 72 includes the second gap δ2 generated between the clutch-side engagement surface SC2 and the link-side engagement surface SL2 in the second relative rotation direction R2 in which the front spoiler 5 is displaced in the retraction direction, based on external force. The second gap δ2 is generated in such a way as to be narrower than the first gap δ1.

According to the above-described configuration, a size of a retraction-direction backlash generated in the front spoiler 5 can be suppressed smaller than a size of a deployment-direction backlash, based on the gaps δ generated in the second coupling portion 72 having the configuration as the fitting-coupling portion 70. As a result, it is possible to suppress retraction-direction displacement caused by traveling wind that the front spoiler 5 receives, while securing the gaps δ between the clutch-side engagement surfaces SC and the link-side engagement surfaces SL. Thereby, excellent aerodynamic performance thereof can be secured.

(2) The spoiler device 10 includes the first stopper portion 81 provided in the driven link 27 as the first link 41, and the second stopper portion 82 provided in the connection link 32 as the second link 42. Further, the first stopper portion 81 and the second stopper portion 82 are configured in such a way as to engage with each other at the relative rotation position X of the driven link 27 and the connection link 32 at which the driven link 27 and the connection link 32 coupled to each other via the clutch unit 40 rotate integrally with each other. Thereby, the stopper mechanism 85 is formed in such a way as to restrict relative rotation between the driven link 27 and the connection link 32 in the first relative rotation direction R1.

According to the above-described configuration, based on the function of the stopper mechanism 85, it is possible to restrict the relative rotation between the driven link 27 and the connection link 32 in the first relative rotation direction R1 in which the front spoiler 5 is displaced in the deployment direction by application of external force. Thereby, it is possible to suppress rattling of the front spoiler 5 caused by the gaps δ between the clutch-side engagement surfaces SC and the link-side engagement surfaces SL that constitute the fitting-coupling portion 70.

In other words, when the front spoiler 5 is in a retracted state at the time of low-speed traveling or the like for example, rattling that occurs in the front spoiler 5 can be suppressed small. Thereby, accumulation of damage caused by occurrence of rattling can be minimized, and durability and reliability can be improved.

In addition, for example, at the time of touching during maintenance, rattling of the front spoiler 5 in a deployed state can be also suppressed small. Thereby, a high sense of quality can be secured.

(3) The spoiler device 10 includes a pair of the stopper mechanisms 85 and 85 provided in such a way as to be separated from each other in the axial direction of the coupling shaft 33.

According to the above-described configuration, relative rotation between the driven link 27 and the connection link 32 can be restricted in a well-balanced manner. Thereby, a posture of the front spoiler 5 can be stably maintained.

(4) The spoiler device 10 includes the compression coil spring 65 as the biasing member 63 biasing the second engagement member 52 in the axial direction of the coupling shaft 33 and thereby pressing the second engagement surface 58 provided in the second engagement member 52, against the first engagement surface 57 provided in the first engagement member 51. The first engagement surface 57 and the second engagement surface 58 each have the configuration as the cam surface 60 in which the mountain portion 60a and the valley portion 60b are alternately continued around the coupling shaft 33. In the clutch mechanism 45, the first engagement member 51 and the second engagement member 52 rotates integrally with each other around the coupling shaft 33, based on force of engagement between the first engagement surface 57 and the second engagement surface 58 that engage with each other based on biasing force of the compression coil spring 65. The first engagement surface 57 and the second engagement surface 58 slide on each other around the coupling shaft 33 while accompanied by axial-direction displacement of the second engagement member 52 against biasing force of the compression coil spring 65, and thereby, the clutch mechanism 45 allows the relative rotation based on application of external force.

According to the above-described configuration, concerning the second coupling portion 72 that couples the second engagement member 52 and the connection link 32 to each other, the gaps δ for allowing axial-direction displacement of the second engagement member 52 need to be generated between the clutch-side engagement surfaces SC and the link-side engagement surfaces SL. However, even in such a configuration, the second gap δ2 generated in such a way as to be narrower than the first gap δ1 can reduce retraction-direction rattling and suppress retraction-direction displacement caused by traveling wind that the front spoiler 5 receives. Thereby, excellent aerodynamic performance can be secured.

Particularly, concerning the fitting-coupling portion 70 constituting the second coupling portion 72 that couples the second engagement member 52 to the connection link 32 to which the front spoiler 5 is fixed, the second gap δ2 generated in such a way as to be narrower than the first gap δ1 can more effectively suppress the retraction-direction displacement.

(5) The first link 41 and the second link 42 are coupled via the clutch unit 40 that includes a pair of the clutch mechanisms 45 and 45 separated from each other in the axial direction of the coupling shaft 33.

According to the above-described configuration, the first link 41 and the second link 42 can be rotated integrally with each other in a well-balanced manner. When external force is applied to the front spoiler 5, the first link 41 and the second link 42 can be rotated relative to each other in a well-balanced manner, based on the external force.

The above-described embodiment can be modified and implemented as follows. The above-described embodiment and the following modified examples can be implemented in combination with each other within a range where technical contradiction does not occur.

In the above-described embodiment, the vehicular aerodynamic device 1 has the configuration as the spoiler device 10 that deploys and retracts the front spoiler 5 as the aerodynamic member 12. However, without limitation to this, the vehicular aerodynamic device 1 may be applied to a configuration of deploying and retracting a different aerodynamic member 12 such as a rear spoiler or a spat.

In the above-described embodiment, the fitting portion 73b of the second engagement member 52 includes the four outward protrusion portions 75 having the substantially trapezoidal shape that includes the shorter edge on a radial-direction outer side. The oblique edges 75a and 75b of each of the outward protrusion portions 75 form the clutch-side engagement surfaces SC1 and SC2 of the second coupling portion 72 having the configuration as the fitting-coupling portion 70. The fitting hole 74b of the connection link 32 includes the four inward protrusion portions 76 having the substantially triangular shape that is tapered inward in the radial direction. The oblique edges 76a and 76b of each of the inward protrusion portions 76 form the link-side engagement surfaces SL1 and SL2 of the second coupling portion 72.

However, without limitation to this, a shape of the fitting portion 73b of the second engagement member 52 constituting the second coupling portion 72 and a shape of the fitting hole 74b of the connection link 32 may be arbitrarily modified. In other words, the gaps δ are generated between the clutch-side engagement surfaces SC formed by the fitting portion 73b and the link-side engagement surfaces SL formed by the fitting hole 74b. Further, the second gap δ2 in the second relative rotation direction R2 in which the front spoiler 5 is displaced in the retraction direction by application of external force is generated in such a way as to be narrower than the first gap δ1 in the first relative rotation direction R1 in which the front spoiler 5 is displaced in the deployment direction by application of external force. As long as the fitting portion 73b and the fitting hole 74b have such a configuration, shapes of the clutch-side engagement surfaces SC and the link-side engagement surfaces SL may be also arbitrarily modified.

The second engagement member 52 may be provided with the fitting hole 74b, and the connection link 32 may be provided with the fitting portion 73b. The fitting hole 74b of the second engagement member 52 may form the clutch-side engagement surfaces SC, and the fitting portion 73b of the connection link 32 may form the link-side engagement surfaces SL.

Further, concerning the first coupling portion 71 having the configuration as the fitting-coupling portion 70 and coupling the driven link 27 and the first engagement member 51 to each other, the second gap δ2 in the second relative rotation direction R2 may be narrower than the first gap δ1 in the first relative rotation direction R1. In other words, concerning at least one of the first coupling portion 71 and the second coupling portion 72 that have the configurations as the fitting-coupling portions 70, the second gap δ2 in the second relative rotation direction R2 may be narrower than the first gap δ1 in the first relative rotation direction R1. In this case, one of the first coupling portion 71 and the second coupling portion 72 may have a coupling structure other than that of the fitting-coupling portion 70.

In the above-described embodiment, the driven link 27 to which drive force of the actuator 13 is input constitutes the first link 41, and the connection link 32 to which the front spoiler 5 is fixed constitutes the second link 42. However, without limitation to this, the first link 41 and the second link 42 may be arbitrarily defined. For example, the connection link 32 may be the first link 41, and the driven link 27 may be the second link 42.

Further, the configuration of the link unit 15 may be also arbitrarily modified. In the link unit 15, the configurations of the first link 41 and the second link 42 coupled to each other via the clutch mechanism 45 may be also arbitrarily modified.

In the above-described embodiment, the clutch unit 40 includes a pair of the clutch mechanisms 45 and 45 provided in such a way as to be separated from each other in the axial direction of the coupling shaft 33. However, without limitation to this, the clutch unit 40 may be configured in such a way as to include one or three or more clutch mechanisms 45 arranged on the coupling shaft 33 that couples the driven link 27 and the connection link 32 to each other.

In the above-described embodiment, the first engagement surface 57 of the first engagement member 51 having the configuration as the cam surface 60 engages with the second engagement surface 58 of the second engagement member 52, and thereby, the clutch mechanism 45 is formed. However, without limitation to this, as long as by engagement between the first engagement member 51 and the second engagement member 52, the clutch mechanism 45 functions as what is called a dock clutch similar to that in the above-described embodiment, the configuration of the clutch mechanism 45 may be arbitrarily modified.

Although a pair of the stopper mechanisms 85 and 85 separated from each other in the axial direction of the coupling shaft 33 are formed in the above-described embodiment, the number of the stopper mechanisms 85 may be one or three or more. The shapes of the first stopper portion 81 and the second stopper portion 82 that engage with each other and thereby form the stopper mechanism 85 may be also arbitrarily modified.

Next, the technical idea that can be understood from the above-described embodiment and modified examples is described.

A vehicular aerodynamic device in which the link unit transmits the drive force input to the first link, to the aerodynamic member connected to the second link, and concerning the fitting-coupling portion that constitutes the second coupling portion, the second gap is generated in such a way as to be narrower than the first gap.

In other words, concerning the fitting-coupling portion provided at a position closer to the aerodynamic member, the second gap is generated in such a way as to be narrower than the first gap, and thereby, a retraction-direction backlash is reduced, and retraction-direction displacement caused by traveling wind that the aerodynamic member receives can be suppressed. Thereby, excellent aerodynamic performance can be secured.

A vehicular aerodynamic device that solves the above-described problem includes a link unit and an aerodynamic member. The link unit is configured by coupling a plurality of link members to one another. The aerodynamic member is deployed and retracted based on drive force to be transmitted via the link unit. The link unit transmits the drive force to the aerodynamic member by integral rotation, around a coupling shaft, of a first link and a second link as the link members that are coupled to each other via a clutch mechanism. The clutch mechanism includes a first engagement member and a second engagement member. The first engagement member is coupled to the first link. The second engagement member is coupled to the second link. The first engagement member and the second engagement member rotate integrally around the coupling shaft by engaging with each other, and rotate relative to each other by external force being applied to the aerodynamic member and larger than force of mutual engagement. At least one of a first coupling portion that couples the first link and the first engagement member to each other and a second coupling portion that couples the second link and the second engagement member to each other is a fitting-coupling portion including a clutch-side engagement surface and a link-side engagement surface that rotate integrally around the coupling shaft by engaging with each other. A first gap is generated, between the clutch-side engagement surface and the link-side engagement surface, in a first relative rotation direction in which the aerodynamic member is displaced in a deployment direction, based on the external force. A second gap is generated, between the clutch-side engagement surface and the link-side engagement surface, in a second relative rotation direction in which the aerodynamic member is displaced in a retraction direction, based on the external force. The second gap is narrower than the first gap.

According to the above-described configuration, a size of a retraction-direction backlash generated in the aerodynamic member can be suppressed smaller than a size of a deployment-direction backlash, based on the gaps generated in the second coupling portion that has a configuration as the fitting-coupling portion. As a result, it is possible to suppress retraction-direction displacement caused by traveling wind that the aerodynamic member receives, while securing the gaps between the clutch-side engagement surface and the link-side engagement surface. Thereby, excellent aerodynamic performance can be secured.

In the vehicular aerodynamic device that solves the above-described problem, the second engagement member may include a plurality of outward protrusion portions that protrude outward in a radial direction. Both-side oblique edges of the outward protrusion portions may form the clutch-side engagement surface of the second coupling portion. The second link may include a plurality of inward protrusion portions on a radial-direction inside. Both-side oblique edges of the inward protrusion portions may form the link-side engagement surface of the second coupling portion.

In the vehicular aerodynamic device that solves the above-described problem, the aerodynamic member may be retracted in a state where a distal end of the aerodynamic member faces to a vehicle rear side. The aerodynamic member may be deployed in a direction of swinging out the distal end of the aerodynamic member to a vehicle front side.

The vehicular aerodynamic device that solves the above-described problem may include a stopper mechanism. In the stopper mechanism, a first stopper portion may be provided in the first link, and a second stopper portion may be provided in the second link. The first stopper portion and the second stopper portion may engage with each other at a relative rotation position of the first link and the second link at which the first link and the second link rotate integrally. Thereby, the stopper mechanism may restrict relative rotation between the first link and the second link in the first relative rotation direction.

According to the above-described configuration, based on the function of the stopper mechanism, it is possible to restrict the relative rotation between the first link and the second link in the first relative rotation direction in which the aerodynamic member is displaced in the deployment direction by application of external force. Thereby, it is possible to suppress rattling of the aerodynamic member being caused by the gaps between the clutch-side engagement surface and the link-side engagement surface that constitute the fitting-coupling portion.

Specifically, when the aerodynamic member is in a retracted state at a time of low-speed traveling or the like for example, rattling that occurs in the aerodynamic member can be suppressed to be small. Thereby, accumulation of damage caused by occurrence of the rattling can be minimized, and durability and reliability can be improved.

In addition, for example, at a time of touching during maintenance, rattling of the aerodynamic member in a deployed state can be also suppressed to be small. Thereby, a high sense of quality can be secured.

The vehicular aerodynamic device that solves the above-described problem may include a plurality of the stopper mechanisms that are provided in such a way as to be separated from one another in an axial direction of the coupling shaft.

According to the above-described configuration, relative rotation between the first link and the second link can be restricted in a well-balanced manner. Thereby, a posture of the aerodynamic member can be stably maintained.

The vehicular aerodynamic device that solves the above-described problem may include a biasing member. The biasing member may bias the second engagement member in the axial direction of the coupling shaft. Thereby, the biasing member may press a second engagement surface provided in the second engagement member, against a first engagement surface provided in the first engagement member. The first engagement surface and the second engagement surface may be each a cam surface in which a mountain portion and a valley portion are alternately continued around the coupling shaft. The clutch mechanism may be configured in such a way that the first engagement member and the second engagement member rotate integrally, based on force of engagement between the first engagement surface and the second engagement surface that engage with each other, based on biasing force of the biasing member. The clutch mechanism may be configured in such a way that the first engagement surface and the second engagement surface slide on each other around the coupling shaft while accompanied by axial-direction displacement of the second engagement member against the biasing force, and thereby, the first engagement member and the second engagement member are allowed to rotate relative to each other, based on application of the external force. Concerning the fitting-coupling portion that constitutes the second coupling portion, the second gap may be generated in such a way as to be narrower than the first gap.

According to the above-described configuration, concerning the second coupling portion that couples the second engagement member and the second link to each other, the gaps for allowing axial-direction displacement of the second engagement member need to be generated between the clutch-side engagement surface and the link-side engagement surface. However, even in such a configuration, the second gap generated in such a way as to be narrower than the first gap can reduce retraction-direction rattling and suppress retraction-direction displacement caused by traveling wind that the aerodynamic member receives. Thereby, excellent aerodynamic performance can be secured.

The vehicular aerodynamic device that solves the above-described problem may include a plurality of the clutch mechanisms that are provided in such a way as to be separated from one another in the axial direction of the coupling shaft.

According to the above-described configuration, the first link and the second link can be rotated integrally in a well-balanced manner. When external force is applied to the aerodynamic member, the first link and the second link can be rotated relative to each other in a well-balanced manner, based on the external force.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicular aerodynamic device comprising:
a link unit that is configured by coupling a plurality of link members to one another; and
an aerodynamic member that is deployed and retracted based on drive force to be transmitted via the link unit, wherein
the link unit transmits the drive force to the aerodynamic member by integral rotation, around a coupling shaft, of a first link and a second link as the link members that are coupled to each other via a clutch mechanism,
the clutch mechanism includes:
a first engagement member coupled to the first link; and
a second engagement member coupled to the second link,
the first engagement member and the second engagement member rotate integrally around the coupling shaft by engaging with each other, and rotate relative to each other by external force being applied to the aerodynamic member and larger than force of mutual engagement,
at least one of a first coupling portion that couples the first link and the first engagement member to each other and a second coupling portion that couples the second link and the second engagement member to each other is a fitting-coupling portion including a clutch-side engagement surface and a link-side engagement surface that rotate integrally around the coupling shaft by engaging with each other, and
a first gap is generated, between the clutch-side engagement surface and the link-side engagement surface, in a first relative rotation direction in which the aerodynamic member is displaced in a deployment direction, based on the external force, a second gap is generated, between the clutch-side engagement surface and the link-side engagement surface, in a second relative rotation direction in which the aerodynamic member is displaced in a retraction direction, based on the external force, and the second gap is narrower than the first gap.

2. The vehicular aerodynamic device according to claim 1, wherein
the second engagement member includes a plurality of outward protrusion portions that protrude outward in a radial direction,
both-side oblique edges of the outward protrusion portions form the clutch-side engagement surface of the second coupling portion,
the second link includes a plurality of inward protrusion portions on a radial-direction inside, and
both-side oblique edges of the inward protrusion portions form the link-side engagement surface of the second coupling portion.

3. The vehicular aerodynamic device according to claim 1, wherein
the aerodynamic member is retracted in a state where a distal end of the aerodynamic member faces to a vehicle rear side, and
the aerodynamic member is deployed in a direction of swinging out the distal end of the aerodynamic member to a vehicle front side.

4. The vehicular aerodynamic device according to claim 1, further comprising
a stopper mechanism in which, at a relative rotation position of the first link and the second link at which the first link and the second link rotate integrally, a first stopper portion provided in the first link and a second stopper portion provided in the second link engage with each other and thereby restrict relative rotation between the first link and the second link in the first relative rotation direction.

5. The vehicular aerodynamic device according to claim 4, further comprising:
a plurality of the stopper mechanisms that are provided in such a way as to be separated from one another in an axial direction of the coupling shaft.

6. The vehicular aerodynamic device according to claim 1, further comprising
a biasing member that biases the second engagement member in an axial direction of the coupling shaft, and thereby presses a second engagement surface provided in the second engagement member, against a first engagement surface provided in the first engagement member, wherein
the first engagement surface and the second engagement surface are each a cam surface in which a mountain portion and a valley portion are alternately continued around the coupling shaft,
the clutch mechanism is configured in such a way that the first engagement member and the second engagement member rotate integrally, based on force of engagement between the first engagement surface and the second engagement surface that engage with each other, based on biasing force of the biasing member,
the clutch mechanism is configured in such a way that the first engagement surface and the second engagement surface slide on each other around the coupling shaft while accompanied by axial-direction displacement of the second engagement member against the biasing force, and thereby, the first engagement member and the second engagement member are allowed to rotate relative to each other, based on application of the external force, and
concerning the fitting-coupling portion that constitutes the second coupling portion, the second gap is generated in such a way as to be narrower than the first gap.

7. The vehicular aerodynamic device according to claim 1, further comprising
a plurality of the clutch mechanisms that are provided in such a way as to be separated from one another in an axial direction of the coupling shaft.

* * * * *